March 1, 1966     R. H. SCHUMAN     3,238,430
MACHINE CONTROL SYSTEM
Filed Sept. 5, 1961     7 Sheets-Sheet 1
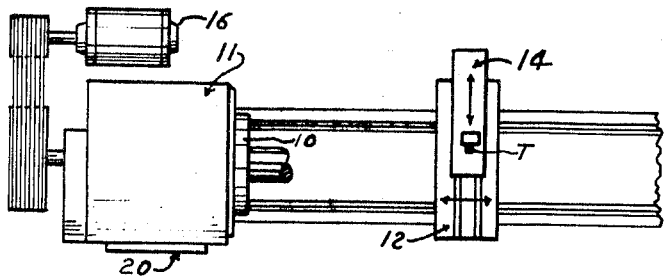
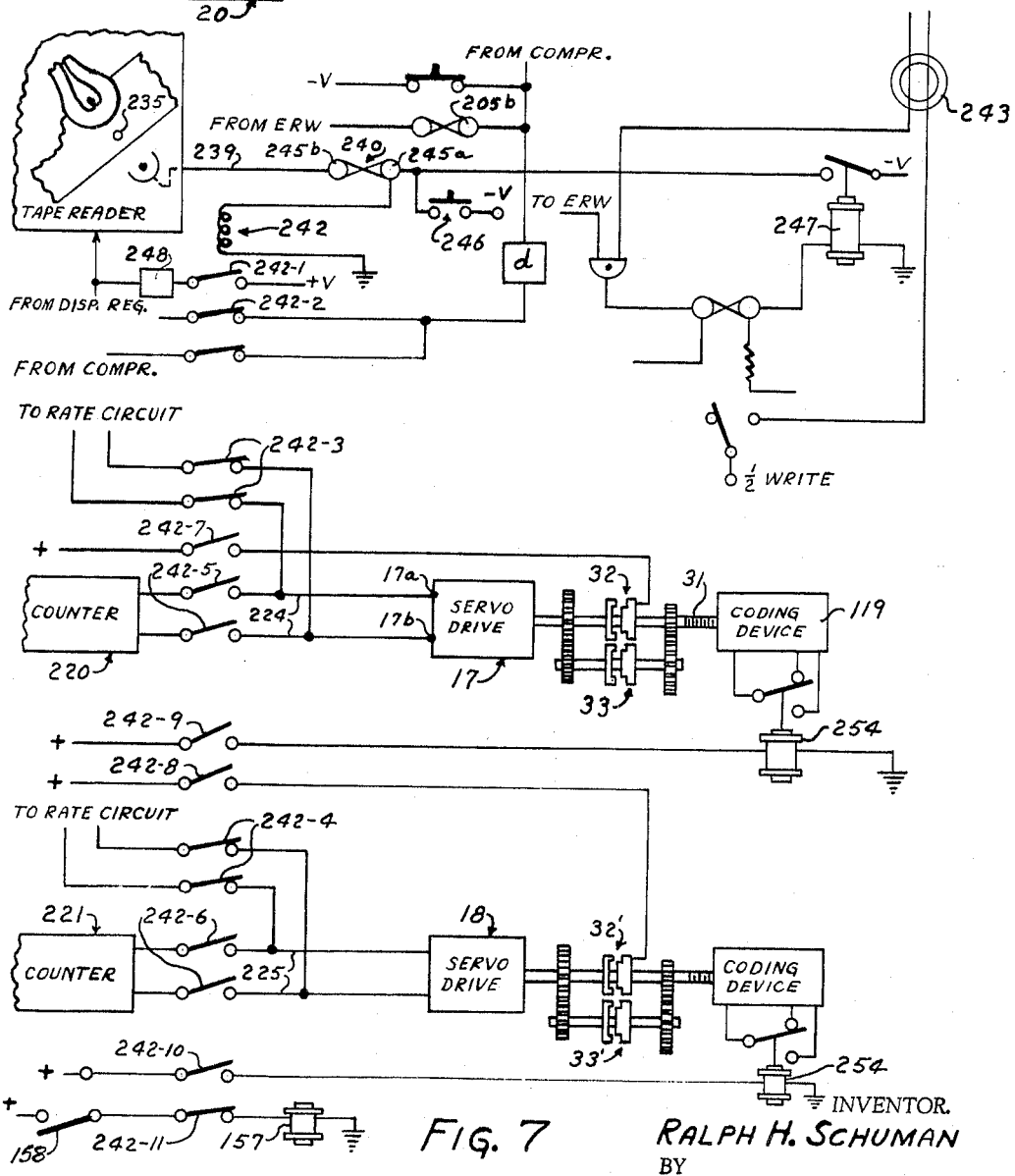
Fig. 1
Fig. 7
INVENTOR.
RALPH H. SCHUMAN
BY
Williams, David, Hoffmann & Yount
ATTORNEYS INVENTOR.
RALPH H. SCHUMAN
BY Williams, David,
Hoffmann & Yount
ATTORNEYS

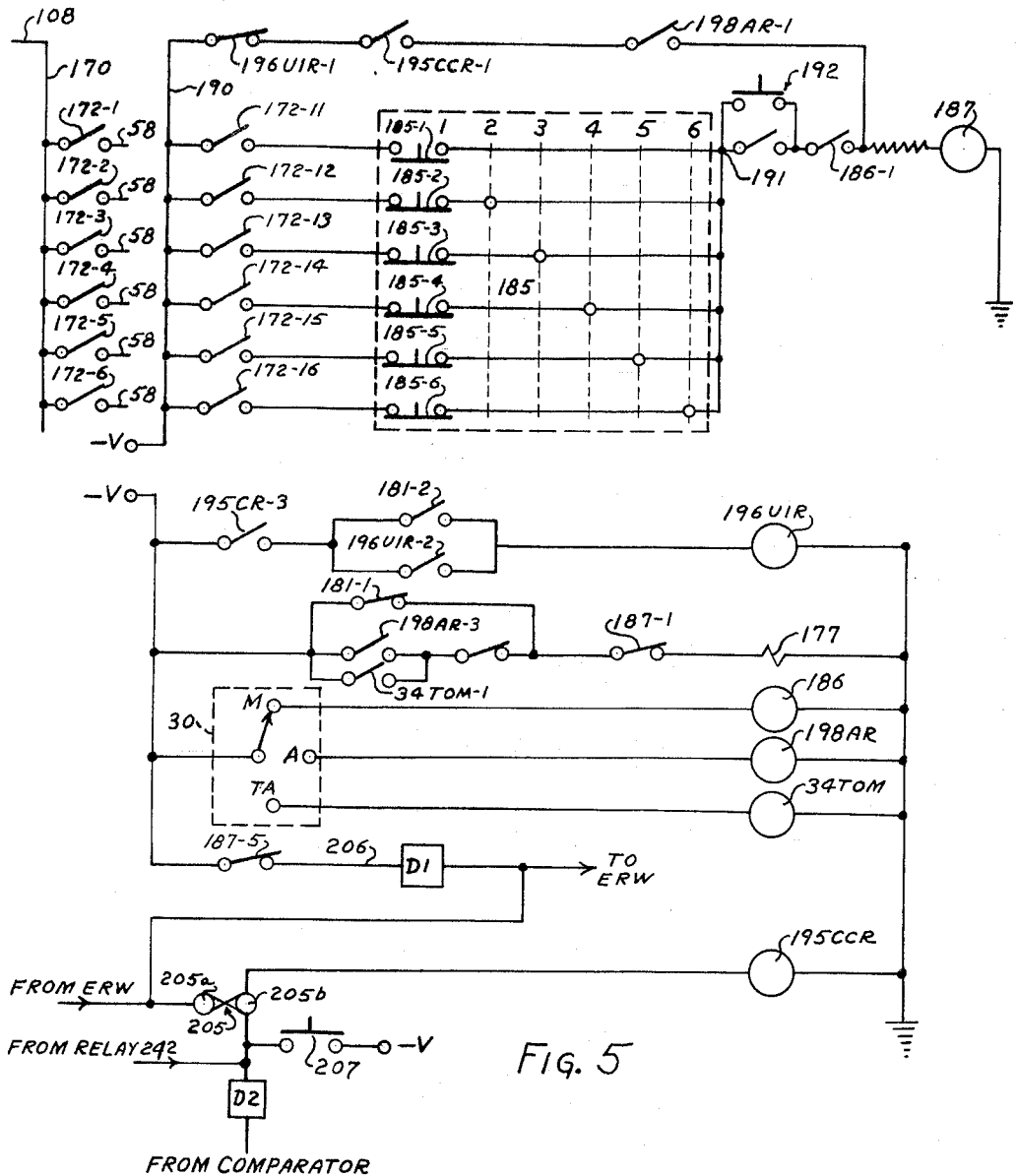
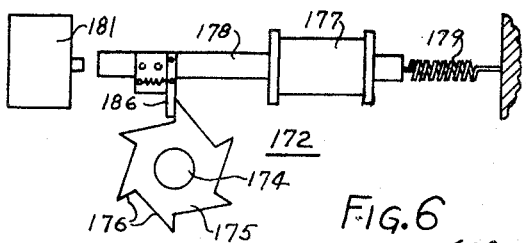
Fig. 5
Fig. 6
INVENTOR.
RALPH H. SCHUMAN
BY
Williams, David, Hoffmann & Yount
ATTORNEYS INVENTOR.
RALPH H. SCHUMAN
BY
Williams, David, Hoffmann & Yunt
ATTORNEYS United States Patent Office 3,238,430
Patented Mar. 1, 1966

3,238,430
MACHINE CONTROL SYSTEM
Ralph H. Schuman, Cleveland, Ohio, assignor to The Warner & Swasey Company, Cleveland, Ohio, a corporation of Ohio
Filed Sept. 5, 1961, Ser. No. 136,106
22 Claims. (Cl. 318—18)

The present invention relates to a machine control system for effecting the control of a machine in accordance with manual controls or in accordance with recorded information.

The present invention is suitable for use to control various types of machines but is particularly suitable for use in a machine tool. In machine tools, slides and movable members thereof have been positioned or controlled in accordance with information stored in record form, and the positioning of the slide or other movable member has been done with respect to a fixed reference. Information indicating the desired position of the slide relative to a fixed reference is compared with information indicating the existing position and the slide moved until the information indicating the existing position corresponds to that indicating the desired position. In another type of system which is used in machine tools, a tool is moved along a predetermined path by moving it from point to point along the path in accordance with information which indicates the path that the tool is to take from is immediate point to the next point. This type of system is called a point-to-point or incremental-type system and is used in machine tools to effect the cutting or following of a contour.

An important object of the present invention is to provide a new and improved machine with has a reusable electrical memory system for storing information in the form of commands to be executed by the machine and which memory system can be set in accordance with the settings of various control elements of the machine as the machine is operated manually through a sequence of operations to effect a record of the operations and of a number indicative of a shaft position of an element or member being positioned at the end of each operation to provide commands which are then used to control the machine to cause it to duplicate the sequence of operations under the control of the stored commands.

Another object of the present invention is to provide a new and improved machine having movable elements to be operated in a predetermined manner and wherein the elements can be controlled by information on a record, such as a punched tape, or by information stored in an electrical memory system which is adapted to record settings of the control elements of the machine with the electrical memory system being erasable and resettable when it is desired to change the stored command.

Yet another object of the present invention is to provide a new and improved machine tool wherein the movement of a tool can be controlled by an incremental point-to-point type system to produce or follow a contour or by an absolute-type positioning system which is capable of moving the tool to a position represented by a number indicative of the displacement of the position from a fixed reference.

Still another object of the present invention is to provide a new and improved coding device adapted to provide a number indicative of the absolute position of a shaft or incremental pulse trains for indicating increments of shaft movement and also, preferably, the direction of shaft movement.

A further object of the present invention is to provide a new and improved machine having a movable member adapted to be controlled by an absolute positioning system including an information storage of the type which can be repeatedly erased and set and an incremental-type system which is controlled by a record device, such as a punched tape, and in which the control of the machine is automatically switched between the two systems.

A still further object of the present invention is to provide a new and improved machine including a movable member and a plurality of control elements for controlling the movement of the member and in which a magnetic information storage can be set in accordance with the control elements for the member and the information subsequently utilized to effect the setting of these control elements from the storage.

Furthermore, an object of the present invention is to provide a new and improved machine as in the next preceding object wherein the information in the storage can be read out onto a permanent record and wherein the storage can be reset in accordance with the record.

Further objects and advantages of the present invention will be apparent from the following detailed description thereof made with respect to the accompanying drawings forming a part of the present specification and in which:

FIG. 1 is a fragmentary plan view, somewhat diagrammatic, of a lathe embodying the present invention;

FIG. 5 is a circuit drawing showing the operation of the command selector;

FIG. 6 is a diagrammatic mechanical showing of the stepping mechanism of the command selector;

FIG. 7 is a circuit drawing showing the transfer circuitry for transferring between tape and memory control;

The present invention is particularly useful when embodied in a machine tool having a rotating work-supporting spindle and a tool movable longitudinally and transversely of the spindle axis to perform a machining operation on the work-piece supported by the spindle, and the present invention has been embodied in such a machine which is shown diagrammatically in FIG. 1.

Referring to FIG. 1, the machine has a rotatable work-supporting spindle 10 mounted in a headstock 11 and a cross slide carriage 12 supported on ways extending to the right of the work-supporting spindle 10 and parallel to the axis thereto for movement toward and away from the spindle. The cross slide carriage supports a cross slide 14 which is movable transversely of the spindle axis on the cross slide carriage and the cross slide is adapted to mount a tool T for performing a machining operation on a workpiece supported in and rotated by the spindle 10.

Figure 2:
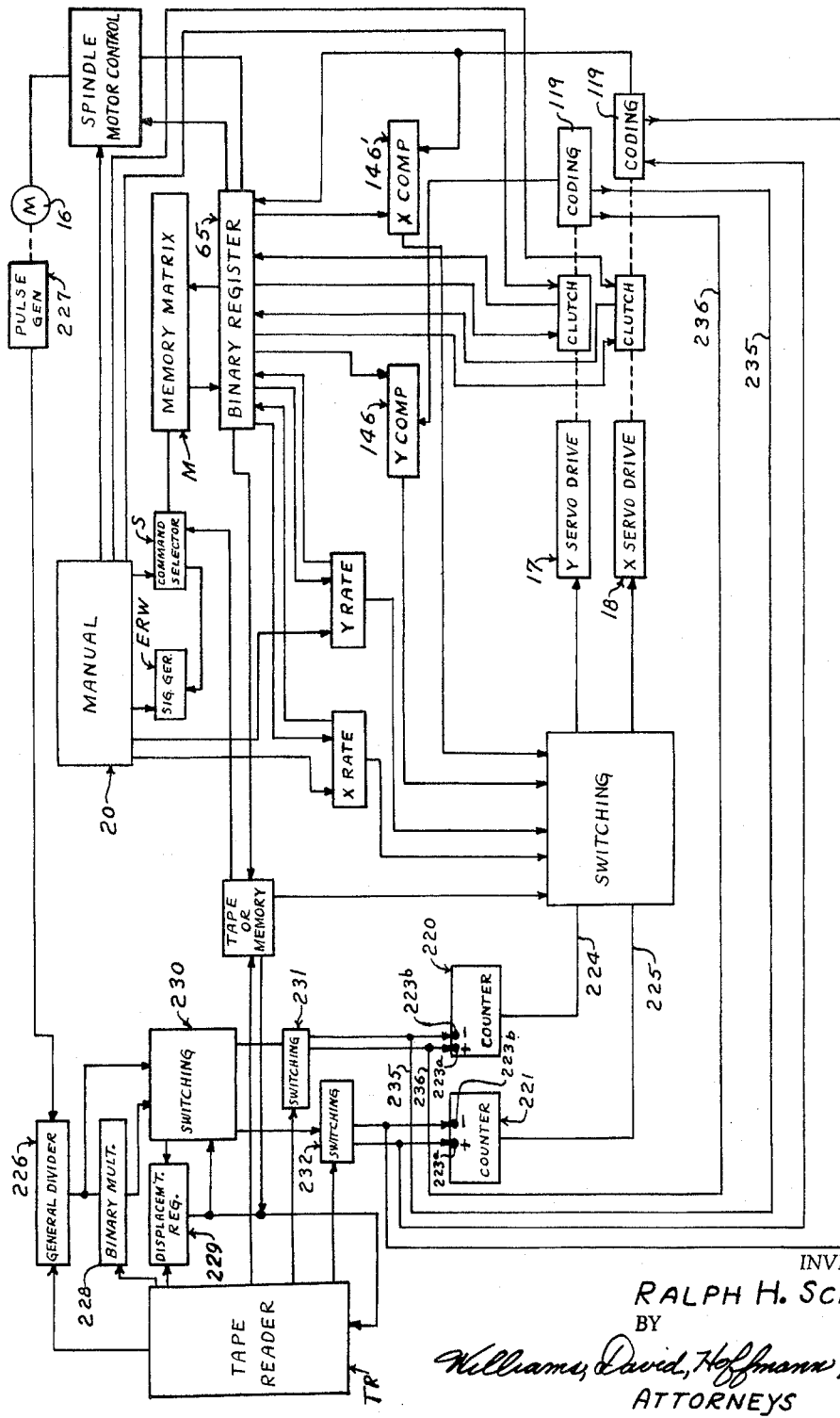
FIG. 2 is a block diagram of the control system for the machine in FIG. 1.

The spindle 10 is rotated by a motor 16 shown diagramatically in FIG. 2 and the cross slide carriage is moved along the spindle axis, sometimes hereinafter referred to as the Y axis, by a servodrive 17 while the cross slide is moved transversely of the spindle axis along an axis, sometimes hereinafter referred to as the X axis, by a corresponding device servodrive 18. The servodrives 17, 18 are operable simultaneously or independently of each other to effect movement of the tool T along a desired path.

Figure 4:
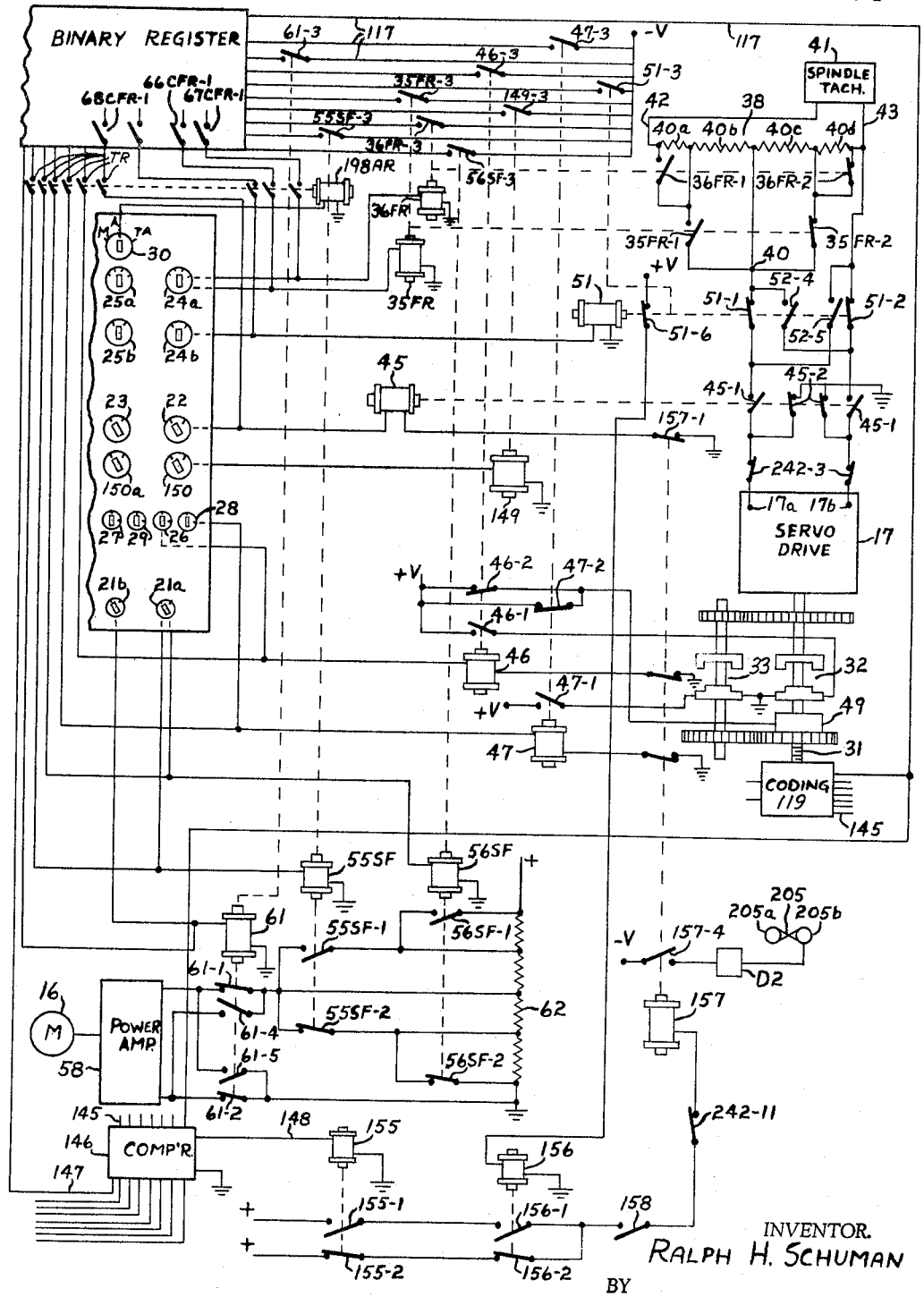
FIG. 4 is a circuit drawing illustrating the circuits for effecting manual control of the machine.

The operation of the machine can be controlled from the operator's console 20 mounted on the machine and including control switches 21a, 21b for respectively selecting the rate and direction of spindle rotation, control switches 22, 23 for respectively selecting operation of the cross slide carriage and cross slide, control switches 24a, 24b for respectively controlling the rate and direction of operation of the cross slide carriage, control switches 25a, 25b for respectively determining the rate and direction of operation of the cross slide, control switches 26, 27 for selecting the feed rate of the cross slide carriage and cross slide, respectively, control switches 28, 29 for selecting the rapid traverse rate of the carriage and cross slide, respectively, and a selector switch 30 for conditioning the machine to operate under manual control, or for automatic operation, as will be explained in more detail hereinafter. For the present, suffice it to say that when the switch is on its manual position "M," it energizes a relay 186 (see FIG. 5) and when in automatic position "A," a relay 198AR (FIGS. 4 and 5), and when in a third position "TA," a relay 34TOM (FIG. 5).

The Y servodrive 17 can be selectively connected to drive a lead screw 31 for moving the cross slide carriage by engaging a feed clutch 32 or a rapid traverse clutch 33, respectively. The clutches 32, 33 are electric clutches whose energization may be selectively controlled by the switches 26, 28. The switches 26, 28 select either the feed clutch 32 or the rapid clutch 33 in the corresponding drive. Similarly, the cross slide is moved at a feed rate by engaging a feed clutch, or at a rapid traverse rate by engaging a rapid traverse clutch, all under the control of the switches 27, 29. The X clutches have been given the same reference numeral as the Y clutches with a prime affixed thereto.

The servodrive 17 has input terminals 17a, 17b and operates at a rate dependent upon the magnitude of a control signal applied thereto and in a direction dependent upon the sense of the applied signal so that the direction of operation can be reversed by reversing the sense of the signal applied to the servodrive. The rate switch 24a determines the magnitude of the signal, while the direction switch 24b determines the sense of the signal. The cross slide carriage selector switch 22 opens and closes the input circuit to the respective servodrive to condition it to receive the control signal and conditions other control circuits for the respective servodrive. The servodrive 18 is similar and has similar input terminals and control switches. The servodrives will not be described or shown in any further detail since such drives are well known to those skilled in the art and, per se, do not form a part of the present invention.

In addition to the manual controls, the spindle motor 16 and the servodrives 17, 18 are adapted to be controlled by information stored in a memory matrix M or by information on a tape adapted to be read by a tape reader T.

*Manual operation*

In manual operation, the machine is controlled from the manual control console 20 and if the operator desires to move the cross slide carriage, he conditions the various circuits for moving the cross slide carriage by operating the servodrive selector switch 22. The rate of operation of the servodrive 17 is determined by the setting of the rate switch 24a. The rate switch 24a controls a plurality of relays, two in the illustrated embodiment, designated as relays 35FR and 36FR. The relays 35FR and 36FR have contacts respectively designated by the reference numeral applied to the relay with a contact number appended thereto, each relay having three contacts which are shown in the drawings and which are designated by the contact numbers 1, 2 and 3. When the rate selector switch 24a is in one position, the relay 35FR is energized; when the switch is in another position, the relay 36FR is energized; when the switch 24a is in a third position, both the relays 35FR, 36FR are energized; and when in still a fourth position, none of the relays 35FR, 36FR are energized. The relays 35FR, 36FR control the magnitude of the input signal to the servodrive 17 by controlling the portion of the voltage across a potentiometer resistance 38 which is applied to the servomotor. The potentiometer resistance 38 has a center tap 40 and is divided into four sections 40a, 40b, 40c, 40d, proceeding from one end of the resistance to the other with the center tap 40 being disposed intermediate the sections 40b, 40c. Preferably, the resistance section 40b is twice that of section 40a and the resistance sections 40c, 40d are equal to sections 40b, 40a, respectively. The potential across the potentiometer resistance 38 is an A.C. potential derived from a generator 41 driven by the spindle so that the potential across the potentiometer resistance is dependent upon the rate of spindle rotation. The spindle generator is connected across the potentiometer resistance 38 by conductors 42, 43, with the conductor 42 being connected to the potentiometer resistance section 40a and the conductor 43 being connected to the potentiometer resistance section 40d.

The relay 36FR has normally open contacts 36FR-1 connected across the potentiometer resistance section 40a and normally closed contacts 36FR-2 connected across the potentiometer resistance section 40d. The relay 35FR has normally open contacts 35FR-1 connected across the potentiometer resistance section 40b and normally closed contacts 35FR-2 connected across the potentiometer resistance section 40c.

The terminals 17a, 17b are connected through switches to the center tap 40 and to the conductor 43. When the relays 35FR, 36FR are de-energized, the center tap 40 is at the same potential as conductor 43, i.e., ground, and no input potential can be applied to the terminals 17a, 17b. If the relay 35FR or the relay 36FR is energized, the closing of the normally open contacts of the relay short-circuits one potentiometer resistance section between the conductor 42 and the center tap and the opening of its normally closed contacts connects the corresponding resistance section normally shorted thereby into the circuit between the center tap and the conductor 43, i.e., ground, thereby applying a potential to the input of the servodrive 17 which is determined by the ratio of the resistances 40b, 40d or 40a, 40c. When the relay 35FR is energized, its normally open contacts 35FR-1 are closed, short-circuiting the resistance section 40b leaving the resistance section 40a connected between the center tap 40 and the conductor 42. The contacts 35FR-2 of the relay 35FR are open when the relay is energized to remove the short circuit around the resistance section 40c to place this resistance in the circuit between the center tap 40 and the conductor 43, so that the potential applied to the servodrive 17 is now determined by the ratio of the resistances 40a, 40c. When both the relays 35FR, 36FR are energized, the center tap 40 is, in effect, connected directly to the conductor 42 and the full voltage drop appearing across the conductors 42, 43 is applied to the servodrive 17. Consequently, it can be seen that three different rates for any given voltage on the conductors 42, 43 may be selected, one rate being provided when the relay 35FR is energized, a second rate when the relay 36FR is energized, and a third rate when both the relays 35FR, 36FR are energized.

The application of the rate signal to the servodrive 17 is controlled by the selector switch 22 which controls the energization of a relay 45 having normally open contacts 45-1 which break the input circuit to the servodrive 17 when the relay is de-energized and normally closed contacts 45-2 which ground the input when the relay is de-energized.

In addition to the contacts just decribed, the relays 35FR, 36FR have contacts 35FR-3 and 36FR-3, respectively, whose function will be described in more detail hereinafter.

When the selector switch 26 which selects the feed clutch is operated, a relay 46 is energized to close contacts 46-1 and effect energization of the feed clutch 32 and also to close contacts 46-3 in a circuit to be described hereinafter. When the switch 28 is operated, a relay 47 is energized to close its contacts 47–1 to energize the rapid traverse clutch 33 and to close its contacts 47–3 whose purpose will be explained hereinafter.

The relays 46, 47 also have normally open, parallel-connected contacts 46–2, 47–2 which, when closed, effect the release of a brake 49 for the lead screw 31. The opening of both the contacts breaks the circuit for releasing the brake and the brake engages to stop rotation of the screw.

The direction of operation of the servodrive 17 is controlled by the switch 24b having a first position wherein a relay 51 is de-energized and a second position wherein the relay is energized. When the relay 51 is de-energized, its contacts 51–1, 51–2 connect the center tap 40 to one terminal of the servodrive 17 and the conductor 43 to the other terminal and when the relay is energized, its contacts 52–4, 52–5 reverse the connections of the center tap 40 to the terminals of the servodrive 17 so that the motor will operate in the opposite direction. In addition, the relay 51 has contacts 51–3 whose purpose will be explained hereinafter.

From the foregoing, it can be seen that the rate of operation of the servodrive 17, and its direction can be determined by setting the switches 22, 24a, 24b.

The operator's console includes similar control switches and relays for the Y servodrive, but these control switches and relays controlled thereby have not been shown in detail.

The rate of spindle rotation can also be selected from the operator's console 20 by operating the switch 21a which controls the energization of a plurality of relays, two in the illustrated embodiment, designated as relays 55SF, 56SF. The relays 55SF and 56SF control the potential which is applied to a power amplifier 58 which has its output connected to control the rotation of the spindle motor at a rate and in a direction corresponding to the magnitude and sense of the input signal to the power amplifier. The relays 55SF, 56SF have contacts which select a portion of the potential appearing across a potentiometer resistance 62 and apply this potential to the motor. The relays 55SF, 56SF operate contacts 55SF–1, 55SF–2 and 56SF–1, 56SF–2, respectively, to select a portion of the voltage drop appearing across the potentiometer resistance 62. Since the relays 55SF, 56SF and their contacts operate in the same manner as the relays 35FR, 36FR, their operation will not be described further. The relays 55SF, 56SF also have contacts 55SF–3 and 56SF–3, respectively, which perform a function in connection with the memory system to be described in detail hereinafter.

The potentiometer resistance 62 is connected to the power amplifier 58 through the contacts 61–1, 61–2 or contacts 61–4, 61–5 of a reversing relay 61 depending on the condition of energization of the relay to determine the direction of rotation of the spindle, the power amplifier being responsive to the sense of the input signal. The relay 61 is controlled by the spindle direction switch 21b. Relay 61 also has contacts 61–3 whose purpose will be explained hereinafter.

*Memory system*

In addition to being controlled from the operator's console, the relays 35FR, 36FR, 45, 46, 47, 55SF, 56SF, 51, 61, as well as the corresponding relays for the servodrive 18, are also adapted to be selectively energized from the memory matrix M. The memory matrix M may be a conventional matrix made up of a plurality of magnetic cores capable of being set in either of two states of magnetization and arranged in rows and columns, with each row containing a word or command which can be read out to determine the settings of the relays for controlling the spindle motor, the X servodrive, the Y servodrive etc. For each row of cores, there is a common signal connection 58, and for each column of cores there is a common read signal connection 59 and a common ½ write signal connection 60. When a read signal is applied to a row signal connection 58, all cores set in a particular one of the magnetic states, say the (1) state, return to the other state, say the (0) state, and a read-out signal appears on the column read-out connection for that core. Particular cores in a row are set to the (1) state by applying a write signal thereto and in the type of matrix described, a ½ write signal is applied to the row signal connection 58 and a ½ write signal is applied to the column write connection 60 for the core to be set.

In the illustrated embodiment, the memory M may be read out, one command at a time, into a binary register 65. The register 65 includes a relay for each column of the memory so that the information in any row of the memory may be transferred to the register 65. Each row of the memory has a core corresponding to each of the relays for controlling the operation of the spindle motor, the Y servodrive, the X servodrive 18, etc. For example, the register 65 includes a relay 66CFR having contacts 66CFR–1 which are closed when the relay is energized to effect energization of the relay 35FR, see FIG. 4. Similarly, a relay 67CFR has contacts 67CFR–1 for controlling the energization of the relay 36FR, and a relay 68CFR has contacts 68CFR–1 for controlling the energization of the Y selector relay 45. Consequently, these relays can be energized independently of the operator's console by energizing the corresponding relay in the read-out register 65. Similar relays are provided in the register 65 for controlling the energization of relays 46, 47, 55SF, 56SF, etc., so that the register 65 contains relays which are energizable or de-energizable to effect various movements and rates of operation of the servodrives 17, 18 and the spindle. It will be understood that various other control functions, such as lubricating oil, coolant, etc., can be controlled from a relay or relays in the register 65.

The connections for energizing the function relays when the corresponding relay in the binary register 65 is energized are designated by the reference numeral 69 and each connection includes normally open contacts AR of the automatic relay 198AR so that the circuits are effective only when the automatic relay is energized.

The relays in the register 65 are each controlled by a corresponding flip-flop or bistable multivibrator circuit and for the relays illustrated in the drawings, the corresponding flip-flops have been given the same number as the relay with an "A" appended thereto so that the relays 66CFR, 67CFR, 68CFR are controlled by flip-flops 66A, 67A, 68A, respectively. The bistable circuits are illustrated as having two stages 70a, 70b and, when the stage 70a is conductive, the stage 70b is nonconductive and the corresponding relay is de-energized; while when the stage 70b is conductive and the stage 70a nonconductive, the corresponding relay is energized.

The flip-flops in the relay register each correspond to a particular column of cores in the memory and when a set core in that column is read, a read-out signal will appear on the column read connection 59 corresponding to that column and the read-out signal, if applied to the stage 70a of the corresponding flip-flop, will trigger the flip-flop to its state where the stage 70b is conductive and the relay energized.

The read connections 59 are each connected to the stage 70a of the corresponding flip-flop through an AND gate 74. The gates 74 are conditioned to pass the signal which indicates that a set core has been read by applying a negative voltage to a common connection 75 connected to one input of each gate. All of the flip-flops of the register 65 can be returned or set in their state where the stage 70a is conductive by operating contacts 76 in a common ground connection for the stage 70a of all the relay control flip-flops of the register 65. The contacts 76 are operated by a relay 77E which will be explained in more detail hereinafter. Suffice it to say that when the relay 77E is energized, the contacts 76 are opened, and all of the flip-flops in the register 65 are returned to or set in the state where the stage 70a is conductive and the relays 66CFR, 67CFR, 68CFR, etc., are de-energized. The flip-flops may be described as set in a (1) state when the stage 70b is conducting and in a (0) state when the stage 70a is conducting.

Normally, when a core is in its set state and is read to provide a read-out signal on the corresponding read-out connection 59 to set the corresponding flip-flop in its one state, the core is returned to its nonset state and the information would normally be destroyed. In the illustrated memory, the relays of the register 65 have contacts which are closed when the relay is energized to connect the corresponding column write connection 60 to a common write connection 79 for all column write connections. When a ½ write signal is applied to the common write connection 79 and the contacts of a relay are closed to connect the corresponding column read-in connection 60 to the connection 79, the write signal will effect a setting of the core in the column which also has a corresponding ½ write signal applied to its row connection 58. Consequently, as the information is read out and one of the relays is energized, the information is reinserted into the memory by applying a ½ write signal to the connection 79 and to the corresponding row connection.

The selection of the row connection 58 in the memory matrix M to which the read and write signals are applied is under the control of a command selector S which will be described in more detail hereinafter. Suffice it to say that, for the present, the command selector S selects the row of cores which is to be read and also routes the ½ write signal to this row after the row has been read to re-establish the information in the cores.

In operation, the memory matrix M is read and the information reinserted by a sequence of signals developed in an erase-read-write generator ERW. The signal generator ERW includes a two-position read-write selector switch 100 at the manual control station, the switch having one position conditioning the memory to read information from the cores into the read-out register 65. To initiate the read-out operation, a potential, such as a negative potential, is applied to an input connection 101 by depressing an "Operate" switch 100a which triggers a monostable or one-shot multivibrator 102 to switch from its stable state to its nonstable state to momentarily energize the relay 77E to open its contacts 76 and set the bistable multivibrator circuits of the register 65 in their condition where the stages 70a are conducting to thus prepare the circuits to be set in accordance with the information in the memory matrix M. When the monostable multivibrator 102 returns to its stable state, a pulse signal is derived therefrom and applied to a pair of monostable multivibrators 104, 105 to trigger them from their stable state to their nonstable state. When the multivibrator 105 is triggered to its nonstable state, a gating potential is applied through the switch 100 to the connection 75 for conditioning the gates 74 to pass a read-out signal on the corresponding read-out connection from the cores. The triggering of the multivibrator 104 to its nonstable state and its return to the stable state produces a delayed pulse which is applied to a monostable multivibrator 106, which, in turn, is triggered from a stable state to its nonstable state to momentarily effect the energization of a relay 107 to close its contacts to apply a read potential to a connection 108 which is connected through the command selector S to the row of cores selected by the command selector. The multivibrator 105 has a time delay in returning to its stable state sufficient to assure that the cores are read before it returns and closes the gates 74. The information is read from the row of cores into the flip-flops or binary elements 66A, 67A, 68A, etc., of the binary register 65.

When the monostable multivibrator 106 returns to its stable state, the relay 107 is de-energized and a pulse is derived from the multivibrator which is applied over a connection 109 to a monostable multivibrator 110 which, after a delay, produces a pulse which is applied to trigger a monostable multivibrator 112 to effect the momentary energization of a relay 113 having normally open contacts 113–1, 113–2. The normally open contacts 113–2, when closed, apply a potential to the common column write connection 79 to apply a ½ write signal to the column write connections 60 which are connected by the contacts of an energized relay in the register 65 to the connection 79; and the contacts 113–1 apply a ½ write signal to the row of cores which is selected by the command selector S to reinsert the information into the row of cores which was read out by the read signal. It can now be seen that this sequence of signals reads out the information, sets the binary register 65, and reinserts the information in the cores for subsequent use.

It can also be seen that, if the switch 100 is set in its second position, the signal from the multivibrator 105 has no effect and does not condition the gate 74 to pass signals on the read-out connections 59, and that the signal from the relay 107 is applied to the selected row of cores and also to a series of gates 116 to condition the gates to pass signals on respective inputs 117 to the gates, as well as to the connection 108 to reset all cores to their (0) state. There is a gate 116 for each of the flip-flops 66A, 67A, 68A, etc., of the binary read-out register 65 and the output connections of the gates are connected to the stages 70a to set these stages in the condition where stage 70b is conducting when the gates pass a signal. Consequently, if a predetermined signal level is on one of the connections 117 and the gate 116 conditioned, the corresponding flip-flop of the register 65 will be set to its conductive condition and the corresponding relay 66CFR, 67CFR, 68CFR, etc., energized. The energization of these relays will close their contacts 66CFR-2, 67CFR-2, etc., to connect the corresponding column write connection 60 to the common write connection 79 and the ½ write signal, when applied to the connection, will cause the information to be written into the row of cores selected by the command selector and to which a ½ write signal is simultaneously applied.

From the foregoing, it can be seen that by setting the switch 100 in its write position, information contained on the connections 117 can be read into the cores by initiating the erase-read-write cycle of the circuit means for the memory.

It will be recalled that the relays 35FR, 36FR, SR, 46, 47, 55SF, 56SF, etc., for controlling the various functions of the machine and the rates of movement of the slide cross slide carriage, and spindle include contacts which have been given the same number as the relay with the contact number "3" appended and that these contacts are normally open contacts which are closed when the relay is energized. The contacts number "3" of each of the described function relays are in respective connections 117 which correspond to the relay of the relay register for effecting energization of the function relay from the memory. For example, the contacts 35FR-3 are in a connection 117 connceted to the gate 116 corresponding to the relay 66CFR which is energizable to effect energization of the function relay 35FR-1. Accordingly, if the gate 116 is conditioned to pass a signal on the connection 117 corresponding to the relay 35FR and the contacts 35FR-3 are closed, the relay 66CFR can be set in a condition of energization corresponding to that of the relay 35FR and this condition of energization can then be read into the memory by setting the switch 100 to its write position and operating the circuitry to produce the erase-read-write signal sequence. It can now be seen that the contacts 35FR-3, 36FR-3, 46-3, 47-3, etc., provide means for setting the condition of these relays in the memory so that if it is desired to record the condition of the control elements of the machine at any one time, their condition can be read into one row of the memory matrix as a word and can subsequently be read out to perform the same control function.

As a result of the circuitry described thus far, the operator can use the manual controls to effect certain operations. For example, he can select the servodrive 17, the rate of operation of the servodrive 17, spindle rotation, and direction of spindle rotation by properly setting the control elements, i.e., the described switches and relays, and then he can record the settings of the control elements in the memory matrix. The information can then be read out from the memory matrix into the register when it is desired to duplicate the operation.

In controlling a machine tool by the memory, some means is normally required to control the extent of the operation dictated by the memory. If a tool is being moved under the control of the memory by moving the cross slide carriage 12 along the spindle axis, the tool movement will normally be required to stop at a predetermined angular position of the lead screw for moving the carriage. Accordingly, the lead screw for moving the cross slide carriage also drives a coding means 119 including an encoder which provides a position number indicative of the angular position of the lead screw and, in turn, the position of the carriage along the spindle axis with respect to a fixed reference.

Figure 8:
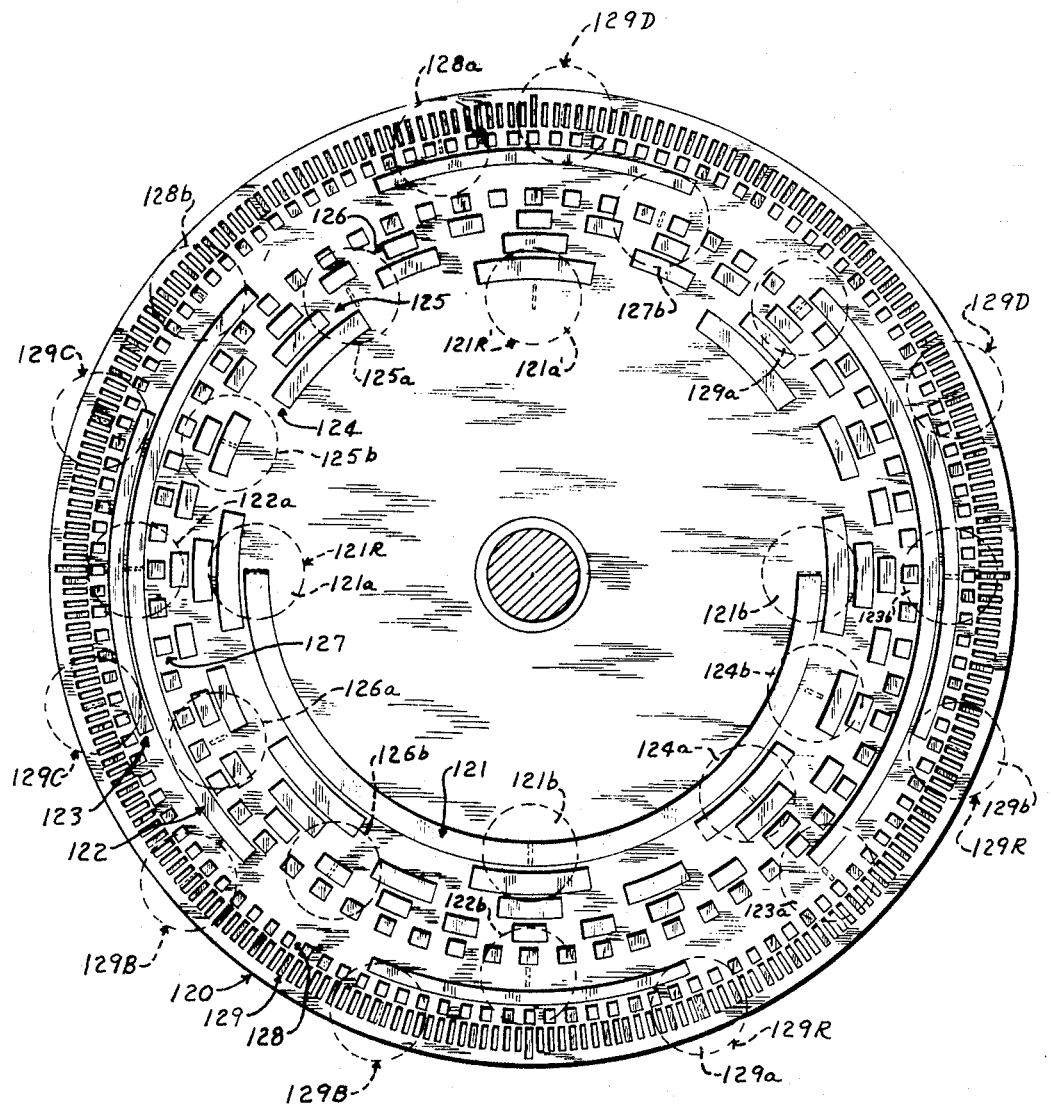
FIG. 8 is a view of a coding disk used with the machine of FIG. 1.
Figure 9:
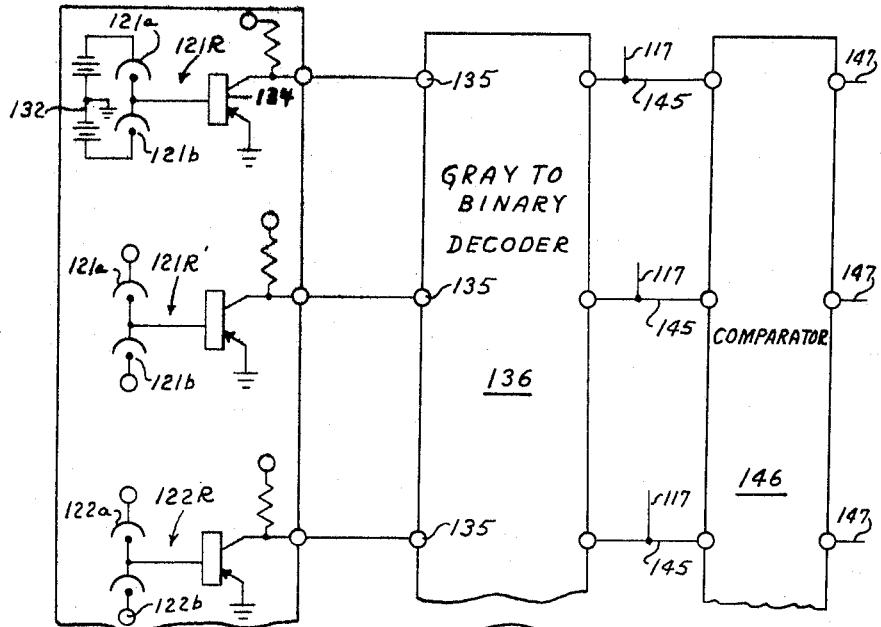
FIG. 9 is a circuit drawing showing the circuitry used with the coding means.
Figure 9:
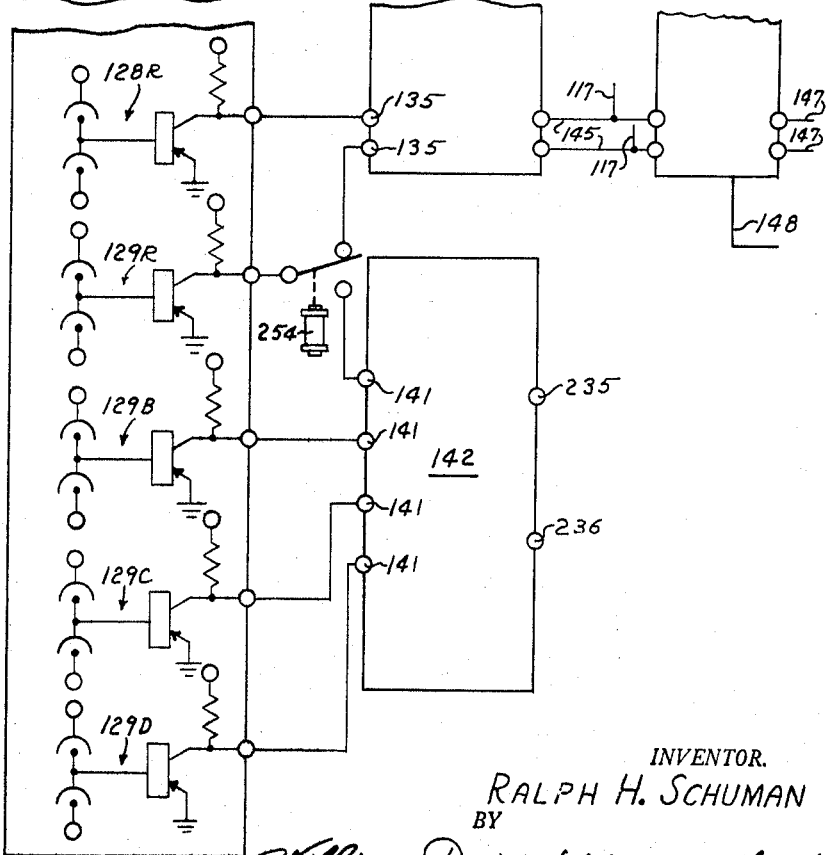

There are many commercially available encoders which might be used to indicate the angular positions of the lead screws for driving the cross slide and cross slide carriage to indicate the displacement of these movable members from a fixed reference. Preferably, however, an encoder as disclosed and claimed in application Serial No. 56,590, filed September 16, 1960 by John Fisher, is used in a machine embodying the present invention and such an encoder includes a code disk 120, shown in FIG. 8. The code disk in FIG. 8 is an opaque disk having zones comprised of alternate opaque and transparent areas forming the code and, in the illustrated disk, the code is a Gray code well known to those skilled in the art. The Gray code is a binary type of code and in the illustrated code disk, ten digits of a Gray code number are represented by nine zones identified by the reference numerals 121–129. In the Gray code, the two coarsest zones have a single transparent division and a single opaque division each of which extend 180° and in the illustrated embodiment, the two coarsest zones have been combined into a single coarse zone and designated by the reference numeral 121. The third coarsest zone in the Gray code has a total of four divisions therein and each succeeding zone proceeding toward the finest zone has twice the number of divisions as the preceding zone and the zones have been numbered 121, 122, 123, etc., in their order of fineness, with the zone 129 being the finest. The zones do not appear in sequence proceeding outwardly from the center of the disk with respect to their degree of fineness but have been interchanged for purposes explained in the aforesaid Fisher application. Each code zone is adapted to be read by a reader unit given the same number as the code zone with an "R" appended thereto, with the exception of the coarsest code zone which is adapted to be read by two reader units 121R, 121R' since the code zone is functioning as the code zones for two digits. The code zone 121 is read by the two reader units 121R, 121R' which are displaced 90° from each other, since in the Gray code the two coarsest zones are displaced in this manner. The reader units each comprise two photoelectric reading devices to read the divisions of the zone and these reading devices are displaced one code division or zone division from each other, or a multiple thereof, and provide a single signal which alternately is at a high level or low level depending upon whether a transparent or an opaque portion is opposite one of the reading devices. The individual reading devices are designated by the zone number with an "a" and a "b," respectively, applied thereto with the devices of the reader unit 121R' being designated by the reference numerals 121a', 121b'. FIG. 9 of the application illustrates the reading unit in diagrammatic form and as shown therein, the two reading devices 121a, 121b of the zone 121 comprise photoelectric cells connected together across a power supply shown as a center tap battery 132 having the center tap grounded. The reading devices are connected in series and the connection between the cathode of the reading device 121a, and the anode of the reading device 121b is connected to the base of a transistor 134. The output of the transistor 134 is connected to a terminal 135 of a decoding circuit 136 comprising part of the coding means and which converts the Gray code to a binary code. The reading units 121R', 122R, 123R, etc., have corresponding elements to the reading element 121R and, therefore, will not be described but the elements have been given the same reference numerals and the output of each element is connected to a corresponding terminal 135 on the decoding circuit 136.

For purposes which will appear hereinafter, the reading unit 129R for the finest zone of the code disk may be selectively connected to a terminal 135 of the decoding circuit 136 or to a terminal 141 of a direction-sensing circuit 142 whose purpose and function will be explained in more detail hereinafter. Moreover, the fine zone also contains reading units 129B, 129C and 129D displaced about the zone for reasons which will be explained in more detail hereinafter, each reading unit including two photoelectric cells.

The output of the Gray-to-binary circuit 136 for the servodrive 17 appears as binary-coded signals on output connections 145 and is connected to a comparator 146 which also has a plurality of additional input connections 147. Each of the input connections 147 is adapted to have a high or low level signal thereon representing a binary digit and the digits on the output connections 145 from the decoding circuit are compared with the digits on connections 147 and when a match is effected, an output signal on a connection 148 from the comparator indicates the correspondence. The input connections 147 to the comparator include the contacts of respective relays in the binary register 65, so that if the relays are energized, a high level signal is applied to the input connection and if de-energized, a low level signal is applied. Consequently, the number which is set in the comparator may be determined by energizing or de-energizing a particular set of relays in the register 65 under the control of the memory cores. This set of relays also has corresponding connections 117 for energizing the relays preparatory to writing information into the memory. These connections 117 are connected to a respective output connection 145 from the Gray-to-binary circuit 136 so that the memory may be set in accordance with the number appearing at the decoder output. Each output connection 145 from the decoder is, in other words, connected to a corresponding connection 117 which is adapted to operate the relay in the register 65 which is adapted to set the digit on the comparator input connection 147 which is to be compared with the digit on the connection 145 from the decoder. Consequently, the number at the output of the Gray-to-binary decoding circuit may be set in the binary register through the connections 117 and, subsequently, read into the core matrix so that any position number of the cross slide carriage can be stored in the memory.

The servodrive 18 also has a comparator 146' and connections to a coding device 119 and to the memory which correspond to the described connections 145, 147 associated with the servodrive 17.

When a series of operations are to be performed and then duplicated, the controls of the machine are set to perform the first operation and the tool moved in accordance with the controls until a change is to be made, at which time the tool is manually stopped. When the tool is stopped, the settings of the various controls for the machine are stored in one row of the memory. This is done by setting the read-write selector switch 100 and pushing the "Cycle Start" switch 100a which causes the impulse generator to issue a sequence of erase-read-write signals to store the information contained on the connections 117 in the memory. It will be noted, however, that the cross slide and cross slide carriage must be stopped and this is done in manual control by operating the selector switches 22, 23. Consequently, if these elements have been operated, it is necessary to indicate this fact to the memory and, accordingly, the control console includes a switch 150 which may be set to energize a relay 149 for indicating the servodrive 17 has been operated and a similar switch 150a for energizing a relay for indicating that the servodrive 18 has been in use. The switch 150 must be operated prior to recording the information if the servodrive 17 has been operated, and when the corresponding relay is energized, it closes contacts 149–3 in a connection 117 to the relay in the binary register for selecting the servodrive 17.

When the servodrive 17 is operating under the control of the memory system, a signal from the comparator 146 operates switching to stop the movement by breaking the input to the servomotor being controlled and by effecting a de-energization of the clutches connecting the servomotor to the lead screw. Switching systems for accomplishing this are well within the ability of those skilled in the art and, therefore, such switching has not been shown. An application filed by Ralph S. Schuman on March 23, 1961, and assigned to the same assignee as the present application and entitled "Positioning System," discloses in detail and claims one type of system which may be used in response to the signal from the comparator 146 to stop the motor. Basically, in the system disclosed in the just-mentioned Schuman application, the comparator has an output of one level when the number set from the binary register is larger than the number from the coding means, and a different level when the number from the binary register 65 is smaller. When the signal level changes, this indicates a correspondence of compared numbers and dictates a stop. If the approach to the stop position is in one direction, the signal change will be from a first level to a second level and if from the other direction, from the second level to the first level. Accordingly, if the servodrive 17 is operating in one direction, one of the output levels is a stop signal and that same level is a go signal if operating in the other direction. Therefore, switching means is provided to enable the same level to selectively effect the operation or stopping of the servodrive. The comparator output is applied to a relay 155 which has normally open contacts 155–1 and normally closed contacts 155–2. The relay 155 is energized when a high level signal appears at the comparator output and de-energized by a low level signal. The contacts 155–1 are in a circuit including the normally open contacts 156–1 or a relay 156 for energizing a relay 157 having normally closed contacts 157–1, 157–2, and 157–3 in the circuits for energizing the servodrive selector relay 45, and the clutch relays 46, 47 to de-energize these relays and set the brake 49 when the slide is to be stopped, for the servodrive 17. The contacts 155–2 are included with normally closed contacts 156–2 of relay 156 in a second circuit for energizing the relay 157. When the relay 156 is de-energized, the contacts 155–2 will effect the energization and de-energization of relay 157 when the comparator output is respectively at its low and high levels, and if the relay 156 is energized, the condition of energization of relay 157 for a given level is reversed. The relay 156 is controlled by the forward-reverse relay 51 which has normally open contacts 51–6 so that the relay 157 is energized in response to a high or low level comparator output depending on the condition of relay 51. The circuit for energizing the relay 157 from the relay 156 preferably includes switch contacts 158 which can only be opened when the machine is to be operated in manual control and contacts 242–11 which are opened when the machine is controlled by the tape system described hereinafter.

It will be noted that since there are no AR contacts in the connections from the register 65 to the comparator connections 147, the comparator 146 can be used to stop the cross slide carriage when the latter is being operated under manual control. To effect this, the register is set to a position number by reading the memory and the machine switched to manual, but the contacts of switch 158 are left closed so that the comparator circuit is effective to stop the carriage by energizing relay 157.

When the machine is operating under the control of the memory, the particular command which is executed by the system must be read out of the memory matrix and when that command has been executed, the next command must be selected and read from the memory. The command selector S performs the function of selecting the command which is to be executed and also the function of selecting the row of cores into which information is to be set or read when the storage is being set.

The command selector may comprise a stepping mechanism and the stepping mechanism may be of a type which has a plurality of positions to which it may be stepped to make the circuit between an input connection and any one of a plurality of output connections. In the illustrated structure, the input connections would be the connection 108 from the signal generator ERW over which the row read signal and ½ write signal are applied. In FIG. 5, the signals from the signal generator ERW are applied to an input connection 170 of the command selector and this connection may be selectively connected to selected rows of the memory through respective contacts 172–1, 171–2, 172–3, 172–4, 172–5, 172–6 of a stepping mechanism 172. As is shown schematically in FIGS. 5 and 6, the stepping mechanism may include a shaft 174 which is rotated to successive angular positions to make the contacts 171–1 . . . 172–6 in sequence, the shaft being provided with a ratchet wheel 175 which has a number of teeth 176 thereon corresponding to the number of contacts to be made in sequence by the stepping mechanism 172. The ratchet wheel 175 is stepped one angular position to make the following pair of contacts and break the one pair of contacts which had previously been made by the operation of a solenoid 177 which, when energized, moves an armature 178 against the tension of a spring 179 to cock a pawl 180 for stepping the wheel and which, when de-energized allows the spring 179 to operate the pawl to rotate the wheel one step. When the solenoid 177 is energized and the armature 178 cocked, the armature operates a switch 181 which effects de-energization of the solenoid 177 and allows the spring to move the pawl to step the ratchet wheel 175. In addition to operating the contacts 172–1 . . . 172–6, the shaft 174 also operates a plurality of contacts 172–11, 172–12, 172–13, 172–14, 172–15, 172–16, each of the contacts 172–11 . . . 172–16 corresponding to a respective one of the contacts 172–1 . . . 172–6. When the contacts 172–1 are closed, the contacts 172–11 are closed, etc. The contacts 172–11 . . . 172–16 are in circuits for controlling the energization of the solenoid 177 for effecting the stepping of the relay and the circuitry includes a manual switch 185 which may be set to any one of six positions to determine or select the position in which the stepping mechanism 172 is to be set. When the switch 185 is to be operated to select the position of the stepping mechanism and, in turn, the row of the core matrix into which the read and ½ write signals are to be applied, the manual relay 186 is energized by setting switch 30 and this relay has contacts 186–1 connected with the switch 185 and the contacts 172–11 . . . 172–16 into a control circuit for energizing a relay 187. The switch 185 has a set of contacts connected in series with each of the contacts 172–11 . . . 172–16 and these contacts are designated by the reference numerals 185–1, 185–2, 185–3, 185–4, 185–5 and 185–6. The contacts of the switch 185 are closed except when the switch is in a particular position corresponding to a particular set of contacts, at which time the contacts of that set are open. Each of the contacts 172-11 . . . 172-16 is connected in a circuit between a line 190 and a junction 191 with a respective one of the contacts 185-1 . . . 185-6 so that if both contacts in the circuit are closed, the negative potential on line 190 is applied to junction 191. Since one of the contacts 172-11 . . . 172-16 is always made, a circuit will be completed through the switch 185 between the line 190 and the junction 191 unless the contact of the switch 185 which is in series with the closed contact of the stepping mechanism is open by reason of the fact that the switch 185 is set in the corresponding position. The junction 191 is connected to effect energization of the relay 187 through a pushbutton switch 192 and normally open contacts 186-1 of the relay 186 and when the latter contacts are closed, the depression of the pushbutton switch 192 will complete a circuit for energizing the relay 187 provided the stepping mechanism is in a position other than that which is set in the switch 185. For example, if the stepping mechanism is in a position where its contacts 172-11 are closed, and the switch 185 is set in its number three position where its contacts 185-3 are open, a circuit will be completed upon the actuation of switch 192 through the contacts 172-11 and the contacts 185-1 to energize the relay 187. The energization of the relay 187 will close its contacts 187-1 in a circuit for energizing the solenoid 177 to effect the energization and cocking thereof. When the armature 178 operates the switch 181, it will open its normally closed contacts 181-1 which are in series with the contacts 187-1 to effect a de-energization of the solenoid 177 and step the stepping mechanism to open its contacts 172-11 and close its contacts 172-12. Since a circuit is completed, upon the closing of the contacts 172-12, through the contacts 185-2 to the relay 187, the solenoid will again operate to step the mechanism to its position wherein its contacts 172-13 are closed and the others open. This will effect a de-energization of the solenoid 177 since the contacts 185-3 have been opened by the setting of the switch 185 and, consequently, the mechanism has operated to select the third row of the memory by closing its contacts 172-3. From the foregoing, it can be seen that by setting the switch 185 and energizing the relay 186, by depressing PUSHBUTTON switch 192, the command selector S may be operated to select a particular row in the memory core. The contacts 172-11 . . . 172-16 are overlapping contacts in the described embodiment.

In addition to the above, the command selector S can be operated to step one step by energizing relays 195CCR and 198AR. When the relay 195CCR is energized, it completes a circuit for energizing relay 187 from the conductor 190 through normally closed contacts 196UIR-1 of a relay 196UIR, the now closed contacts of the relay 195CCR, designated by the reference numeral 195CCR-1, and normally open contacts 198AR-1 of the relay 198AR which is energized by setting switch 30. When the relay 187 is energized in response to the energization of relay 195CCR, its contacts 187-1 close to energize the solenoid 177, but the opening of the contacts 181-1 of the switch 181 upon the cocking of the armature 178 does not de-energize the solenoid 177 since these contacts are paralleled by a circuit made by the normally open contacts 198AR-3, now closed. Consequently, the solenoid 177 remains energized and no step is taken. The switch 181, however, has normally open contacts 181-2 which are closed by the armature to effect an energization of the relay 196UIR through the now closed contacts 181-2 and through normally open contacts 195CCR-3, of relay 195CCR which are in series with the contacts 181-2. These contacts are normally open contacts but are now closed due to the energization of the relay 195CCR. When the relay 196UIR is energized, it closes self-holding contacts 196UIR-2 in parallel with contacts 181-2 and opens its contacts 196UIR-1 in the circuit for energizing the relay 187 and this opens the contacts 187-1 in the circuit for energizing the solenoid 177 to effect a stepping of the solenoid. When the relay 195CCR is now de-energized, it will open its contacts 195CCR-1 to break the circuit for energizing the relay 187 and will also open its contacts 195CCR-3 for energizing the relay 196UIR. Consequently, the relay 187 is de-energized and remains de-energized upon the de-energization of the relay 195CCR. It can now be seen that by energizing the relay 195CCR, the mechanism is stepped one step and is ready to be operated a second time upon the next energization of relay 195CCR.

The relay 195CCR may be energized and de-energized under the control of a bistable multivibrator 205. When the bistable multivibrator 205, which has stages 205a, 205b, is in one state with the stage 205b conducting, the relay 195CCR is de-energized, and if in its other state where the stage 205a is conductive, the relay 195CCR is energized. The multivibrator 205 may be set in its state where the stage 205a is conductive and the relay 195CCR energized by depressing the pushbutton 207 which momentarily applies a signal to the stage 205b to render the latter nonconductive. When the automatic relay is thus set, this will cause the stepping mechanism to make one step in view of the structure described above and, when the one step has been completed, a circuit 206 is made by the de-energization of the relay 187 to close its normally closed contacts 187-5 in the circuit 206 to supply a negative potential to the signal generator ERW, and to the stage 205a of the multivibrator 205 to reset the latter to normal and de-energize relay 195CCR. This negative potential is applied through a differentiating circuit D1 so that a pulse signal is applied to the stage of the signal generator ERW and multivibrator 205. The signal generator ERW then operates to issue its sequence of erase-read-write signals.

The signal from the comparator upon the completion of a command is also applied to the stage 205b of the multivibrator 205 to effect energization of the relay 195CCR to cause it to read the next command. The relay 157 of the comparator circuit has contacts 157-4 which, when the relay is de-energized, apply a negative potential to the stage 205b through a differentiating circuit D2.

From the foregoing, it can be seen that when the command selector is set for automatic operation, the setting of the multivibrator 205 to its state where the stage 205a is conductive causes the energization of the relay 195CCR to effect the selection of the next row in the memory and a reading of that row to set the binary register to perform the next command. Upon completion of the command, the multivibrator 205 is again operated to select the next command.

A simplified command selector has been shown for the purposes of the present application. An application filed on March 22, 1961 by William J. Frank, Jr. and assigned to the same assignee as the present invention, discloses and claims a command selector which has a units section and a tens section and is adapted to control a memory having 100 rows and also which, when set on one command, can automatically operate to select a command which would normally be a number of steps from the immediate position of the stepping mechanism without requiring the stepping mechanism to step through each position. Moreover, the stepping system disclosed in the aforesaid Frank application can be made to return to a home position from any given position, and this can be accomplished without stepping through each position between the immediate position and the home position if the number of steps is greater than the complements of the settings of the tens and units sections of the switch. The machine preferably embodies such a selector system as disclosed in the aforesaid Frank application.

*Tape system*

The cross slide carriage and the cross slide in the disclosed machine are also adapted to be controlled by information recorded on a punched tape for operating the tool from point to point in increments. The system for controlling the cross slide carriage and the cross slide is shown schematically in FIG. 2. Referring to FIG. 2, bidirectional counters 220, 221 are provided for the servodrives 17, 18, respectively. The bidirectional counters are of a known type to those skilled in the art, and are adapted to receive add pulses at one terminal 223a and subtract pulses at a terminal 223b, sum the pulses and register a number which is the difference of the number of pulses received at the add and subtract terminals and to provide an analogue output signal having a magnitude which depends on the difference in the number of add and subtract pulses and a sense which depends on whether more add pulses or subtract pulses have been totaled. The output signals are applied to the input terminals of the servodrives 17, 18 through connections 224, 225, respectively.

Command pulses are applied to the bidirectional counters and are derived from a spindle generator 227 which issues pulses at a rate dependent upon spindle speed so that the rates of movement of the cross slide and cross slide carriage will be correlated with spindle rotation. The pulses derived from the spindle are applied to a general divider 226 which may be set to divide the pulse train frequency and then to a binary multiplying circuit 228 which has a plurality of binary elements that are set to determine a factor by which the pulse train from the general divider is again divided. The output from the binary multiplier, together with a pulse train directly from the general divider, is applied to the input of switching illustrated diagrammatically by the block 230 and this switching may be set to apply the fast train of pulses to the bidirectional counter 220 and the slow train of pulses to the bidirectional counter 221, or vice versa. The switching includes gating circuits which are opened and closed to effect the application of the pulses to the servosystems and the gates are opened when a certain movement is to be effected and closed at the end of the movement. The fast train of pulses is not only applied to one of the servodrives, but also to a displacement register 229 which is a binary counting-type circuit for counting the pulses from the switching 230 and can be preset to issue a control signal after receiving a predetermined number of pulses. The pulses from the switching means 230 are applied to the servodrives 17, 18 through switching blocks 231, 232, respectively. The switching blocks 231, 232 are settable to direct the pulses to either the add or subtract terminals of the corresponding bidirectional counter.

Each pulse applied to a bidirectional counter effects an increment of movement and when a certain number of pulses have been applied to one of the counters, the tool has reached its desired position and the pulses are to be stopped. The pulse number is preset in the displacement register and the control signal therefrom is applied to the switching circuit 230 to close the gates in the switching 230 and stop the application of pulses to the bidirectional counters and to the displacement register.

In operation, the command pulses for a servodrive are counted by the bidirectional counter and an error signal appears at the output of the bidirectional counter which is indicative of the difference between the command pulses and feedback pulses applied to the terminal of the bidirectional counter different from the one to which the command pulses are applied. If the command pulses are applied to the positive terminal, the feedback pulses will be applied to the negative terminal for movement in the direction dictated by the command pulses. A feedback pulse is applied for each incremental movement of the servodrive and the pulses are derived from the coding device 119. The coding device for the servodrive 17 has connections 235, 236, which are connected to the add and subtract terminals of the bidirectional counter. When the movement of the servodrive 17 is in the direction corresponding to that dictated by a pulse applied to the add terminal, a feedback pulse appears over the line 235 connected to the negative terminal; but, if the motion is in the opposite direction, the pulse appears on the line 236 connected to the add terminal. Consequently, the bidirectional counter sums the command pulses and the feedback pulses and has a number registered therein which is the error in the dictated position and the actual position of the servodrive 17 and the servodrive is operated to reduce this error.

The particular system used to effect simultaneous movement of the servodrives 17, 18 to produce a contour does not, per se, form a part of the present invention. The described system may utilize basic components well known to those skilled in the part and the system, as described, is believed sufficient for purposes of the present application. However, the system itself is the subject of an application filed by Harry W. Mergler March 21, 1960 for "Numerical Control System for a Machine Tool" and assigned to the same assignee as the present invention. The details of the system not described above are set forth in that application.

The switching units for controlling the application of the pulses to the bidirectional counters and the displacement register are set by a tape reader TR which also sets the general divider and binary multiplier. The tape reader TR will not be described in detail and it may be the same as that shown and described in United States Patent No. 2,922,940, issued January 26, 1960 to Harry W. Mergler. The tape reader shown in this patent is adapted to read a tape having information arranged in a plurality of rows and columns and to set this information in the displacement register, binary multiplier, etc. Each row of the tape is read sequentially and the information distributed to the proper register to be set in accordance with that information. Such tape readers are commercially available and a further description of the method of reading and setting is not deemed necessary. For the purposes of the present invention, suffice it to say that the tape reader may be started as in the said Mergler patent, by applying a control signal to the tape reader and this control signal may be in the form of a pulse. The tape reader will then operate to read the information on the tape, set it in the registers, stop the tape when the information has been read and to initiate operation of the system in accordance with the information which has been set. Reference is made to the Mergler patent for the details of operation of the tape reader. In the tape reader shown and described in the Mergler patent, a hole is present on the tape which indicates or produces a stop signal for stopping tape movement. In the present invention an additional hole 235 is provided which, when read, provides a signal for effecting a switch of the control of the machine to the memory. This signal appears over an output connection 239 and is applied to one stage of a bistable multivibrator 240. The bistable multivibrator has a stage 245a which is conductive when the multivibrator is in its normal state and a stage 245b which is conductive when the multivibrator is considered to be in its set stage. The multivibrator 240 controls a transfer relay 242 and, when the multivibrator is in its normal state, the transfer relay 242 is de-energized and, when in its set state, the relay is energized. The signal from the tape reader resets the multivibrator to its normal state to effect a de-energization of the relay. When tape operation is desired, a signal must be applied to the stage 245a to set the multivibrator 240 and energize the relay. This signal may be applied by operating a switch 246, or may be derived from the memory matrix M. Preferably, each row in the memory matrix M has a core 243 therein which, when set, causes the energization of a relay 247 in the binary register 65 to apply a signal to the multivibrator 240 to set the multivibrator in its set state. This energizes the relay 242 to close contacts to render the tape system effective and to open normally closed contacts to render the memory system ineffective and to disconnect the rate circuits from the input of the servomotor. When the transfer relay is energized, the closing of its contacts 242-1 applies a signal to the tape reader T through a differentiating circuit 248 to effect or start operation of the tape reader. The tape reader TR will then operate and continue to control the machine until the tape effects a de-energization of the relay by resetting the multivibrator 240 to its normal state. The resetting of the multivibrator to its normal state will effect a de-energization of the relay 242 to open the contacts in the tape system and to close the contacts in the memory system. The closing of contacts 242-2, applies a signal to the stage 205b of multivibrator 205 to actuate the multivibrator 205 to energize the relay 195CCR to effect a stepping of the memory system to the next command to be executed by the memory system.

It will be noted that the transfer relay 242 does not have any contacts which would prevent the memory from controlling the spindle rate circuit when the machine is being controlled by the tape system. This means that the row of information which indicates that the control of the machine is to be transferred to the tape system can also contain information which sets the spindle speed for the tape system and the spindle set in accordance with the memory. The tape may, if desired, also contain information for setting the spindle speed, etc., and contacts would then be provided to render the memory ineffective to control the spindle.

It will be noted that no problem arises when the tape system returns the control of the system to the memory by reason of the fact that the comparator will be indicating that there is an error in the position of the slides, since the command which had switched the control to the tape system is still set in the binary register and would not have set the switching to complete the circuits between the rate registers and the servodrives. Consequently, even though the comparator indicates that movement should occur, no movement can occur.

Figure 3:
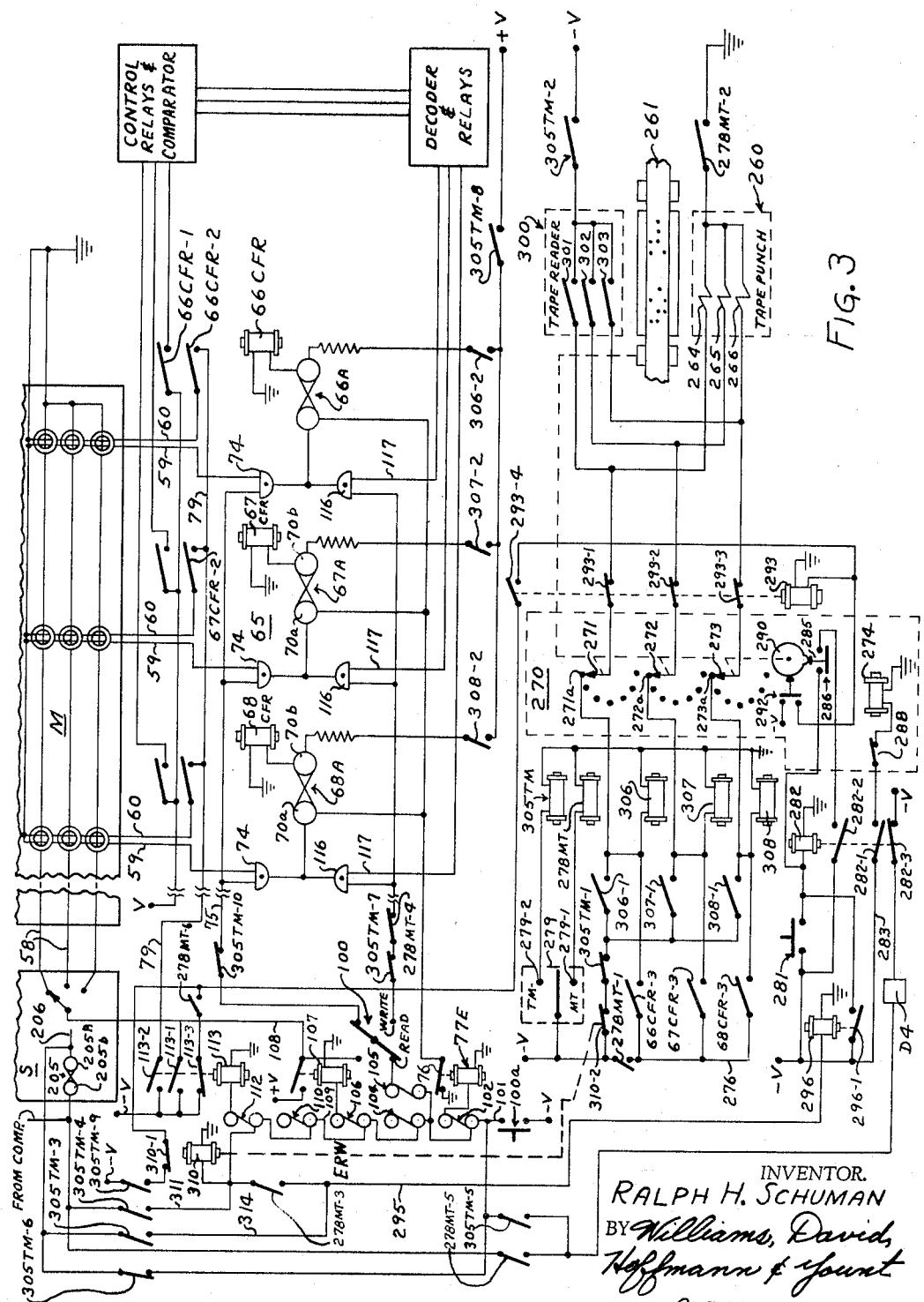
FIG. 3 is a circuit drawing showing the operation of part of the memory system.

In addition to the contacts described, the transfer relay 242 has normally closed contacts 242-3, 242-4 which make and break the circuits from the rate circuits to the servodrives 17, 18, respectively, when actuated between open and closed positions. See FIG. 7. These contacts are also indicated in FIG. 3 for the servodrive 17.

The transfer relay 242 also has normally open contacts 242-5, 242-6 which make and break the connections between the bidirectional counters 220, 221 and servodrives 17, 18, respectively. Thus it can be seen that when the relay 242 is de-energized, the rate circuits controlled by the memory are connected to energize the servodrives, but when the relay 242 is energized, the bidirectional counters are connected to energize the servodrives. When the relay 242 is energized, the feed clutches 32 are also energized by the closing of normally open contacts 242-7, 242-8 to engage the feed clutches. The circuits for engaging the rapid traverse clutches 33 may include interlocking contacts operated by the relay 242, if so desired for assuring that the rapid clutches are not energized. The relay 242 also has normally open contacts 242-9, 242-10 which effect energization of respective relays 254 for switching the coding device driven by the servodrives from operation as the encoder to operation as a quantizer to produce incremental pulses as is explained hereinafter. In addition to the foregoing described contacts, the relay 242 may operate contacts to completely render the bidirectional counters, the displacement registers, and other elements of the tape control system ineffective when the system is operating under the control of the memory and the relay 242 de-energized, and also may include normally closed contacts which, when the relay is energized, render various elements of the system normally controlled by the memory ineffective. In view of the disclosure with reference to the switching for the bidirectional counters, etc., one skilled in the art can supply these interlocking contacts.

In the tape system, the bidirectional counters receive incremental pulses derived from the output of the servodrives. These pulses are derived from the coding devices associated with each drive. As described hereinbefore, the coding device 119 has a code disk with a fine zone 129 which is read by a pair of photocells of a reader unit 129R when the code wheel is providing a number indicative of shaft position. In addition to the reader unit 129R, the fine zone is also adapted to be read by three other reader units 129B, 129C, 129D. These reader units are displaced about the code wheel and provide output signals which are at high or low level, depending upon the nature of the information immediately opposite the reader units and will provide phase-displaced pulse trains which can be analyzed by a direction sensing circuit 142 to provide an output pulse over the line 235 if the rotation is in one direction, and an output pulse over another line 236 if the rotation is in a different direction. Such direction sensing circuits are well known to those skilled in the art and one such circuit is shown in United States Patent No. 2,656,106.

Since the reader unit 129R used with the encoder to provide a position number is also used with the quantizing system to provide pulses indicative of incremental movement of the output shaft, the output of this reader unit is automatically switched between the quantizing circuit and the encoding circuit when the relay 242 is energized and de-energized. This switching is accomplished by contacts on a relay 254 energized and deenergized from the relay 242.

It is desirable to be able to prepare a record of the commands stored in the memory so that when other commands are to be set, the stored commands can be recorded and used to perform the operations at a subsequent time without manually causing the machine to go through a series of operations to set the memory. To this end, a tape marking device in the form of a tape punch, indicated by the reference numeral 260 (FIG. 3), is provided and is adapted to punch a tape 261 in accordance with the information stored in the memory. The tape punch includes punch magnets 264, 265, 266. The system for punching the tape includes a stepping mechanism 270 having a plurality of switch arms 271, 272, 273 connected to effect energization of the punch solenoids 264, 265, 266, respectively. The switch arms 271, 272, 273 have seven positions and in each position the switch arms engage a contact corresponding to that position. The switch arms 271, 272, 273 can be stepped in sequence through their positions by repeatedly energizing and de-energizing a coil 274 which is adapted to operate in the same manner as the stepping coil or the command selector previously described herein. When the switch arms 271, 272, 273 are in their first positions, they respectively engage contacts 271a, 272a, 273a. Each stepping of the mechanism 270 also effects a stepping of the tape 261.

Each relay of the binary register 65 has contacts in a respective circuit between a conductor 276 (FIG. 3) and a respective one of the contacts of the stepping mechanism 270. The contacts for the relays 66CFR, 67CFR, 68CFR are shown in FIG. 3 and have been given the reference numeral 66CFR-3, 67CFR-3 and 68CFR-3, respectively. When one of the contacts 66CFR-3 . . . 68CFR-3 is closed, the corresponding circuit is completed between the conductor 276 and the corresponding contact in the stepping mechanism. In the illustrated embodiment, the circuit containing the contacts 66CFR-3 is connected to the contact 271a, the circuit including the contacts 67CFR-3 is connected to the contact 272a, and the circuit containing the contacts 68CFR-3 is connected to the contact 273a. Consequently, when the stepping mechanism 270 is in its first position, the conductor 276 is connected to the contacts 271a, 272a, 273a, respectively, if the relays 66CFR, 67CFR, 68CFR, are energized and a potential is applied to the switch arms to effect operation of the punch solenoids which are connected to the respective switch arms.

When the punching operation is to take place, a relay 278MT is energized by operating a selector switch 279 to an MT condition to close its contacts 279–1. The energization of relay 278MT closes its contacts 278MT–1 to connect the conductor 276 to the negative side of a power supply so that if any of the contacts 66CFR–3, 67CFR–3, 68CFR–3 are closed, a negative potential will be applied to the corresponding contact of the stepping mechanism 270 and to the corresponding switch arm when it is in engagement with the contact to effect an energization of the corresponding punch solenoid. The relay 278MT also has normally open contacts 278MT–2 which connect the punch solenoids 264, 265, 266 to ground when relay 278MT is energized to complete the circuit for energizing the solenoids. In addition to the contacts 278MT–1 and 278MT–2, the relay 278MT has normally open contacts 278MT–3, 278MT–5, 278MT–6 whose purpose will be explained hereinafter and contacts 278MT–4 which are normally closed contacts in the circuit for conditioning the gates 116 of the binary register 65. These normally closed contacts are opened upon the energization of the relay 278MT and render the gates 116 ineffective to pass any signals which might be on the connections 117 during the operation of the signal generator ERW.

When the tape is to be punched in accordance with the memory, the command selector is operated under manual control to select the row of the memory matrix which is to be read and the switch 100a is operated to initiate the erase-read-write cycle of the signal generator to set the binary register 65 in accordance with the selected row. After the row of the memory matrix has been selected and the binary register 65 set, the switch 30 is set to its TOM position to energize relay 34TOM and close its contacts 34TOM–1 (FIG. 5) in parallel with the contacts 181–1 of the interrupt switch 181 of the selector and the selector switch 279 is operated to its MT position to energize relay 278MT and close its contacts 278MT–1. The closing of these contacts 278MT–1 will apply a negative potential to the conductor 276 and the punches 264, 265, 266, assuming that the stepping mechanism 270 is in its first position shown in the drawings, will be actuated in accordance with the condition of the contacts 66CFR–3, 67CFR–3, 68CFR–3, respectively, and a row of information will be punched on the tape. After the relay 278MT has been set in its MT position, a stepping mechanism start switch 281 is depressed to energize a relay 282 having normally open contacts 282–1 in a circuit 283 for energizing the stepping coil 274. The relay 282 also has self-holding contacts 282–2 which make to complete a circuit around the pushbutton switch 281 and which include the normally closed contacts 285 of a switch 286 which is open when the stepping mechanism 270 is in its first position and closed for all other positions of the stepping mechanism. Consequently, the holding circuit for the relay 282 will be completed as soon as the stepping coil 274 operates to step the stepping mechanism 270 from its first position.

The circuit made by contacts 282–1 for energizing the stepping coil 274 includes self-interrupting contacts 288, which are similar to the self-interrupting contacts of the command selector, and which when the coil is energized, effect an interruption of the circuit 283 to de-energize the stepping coil 274 and effect the stepping of the stepping mechanism 270. The mechanism 270 is now set to its second position to connect the switch arms 271, 272, 273 into circuits controlled by three different relays of the binary register 65 and to punch the tape in accordance with the settings of these next three relays, the tape having been stepped simultaneously with the stepping of the mechanism 270. It will be appreciated that the stepping mechanism 270 will continue to step as long as the relay 282 is energized and the contacts 282–1 in the circuit 283 for energizing the stepping coil 274 are made. The relay 282 is de-energized when the stepping mechanism 270 returns to its first position. At this time a cam 290, stepped with the stepping mechanism, opens the switch 286 to break the holding circuit for the relay 282.

Normally, return movement to the first position would cause a punching operation in accordance with the settings of the relays 66CFR, 67CFR, 68CFR, but since this information has already been punched, the switch arms 271, 272, 273 are rendered ineffective to effect an energization of the punch solenoids 264, 265, 266 when the mechanism is returned to its first postion. In the illustrated embodiment, the cam 290 operates a switch 292 when it is stepped to its seventh or last position to close the switch and energize a relay 293 having normally closed contacts 293–1, 293–2, 293–3 connected in series with the switch arms 271, 272, 273 and the solenoids 264, 265, 266, as well as normally open self-holding contacts 293–4. The relay 293 is a relay which picks up with a slight time delay to allow the punches 264, 265, 266 to operate to punch the information set on the seventh contacts of the stepping mechanism 270. But the relay picks up before the stepping mechanism 270 is stepped to its first position so that the punches will not be operated by the circuits connected to the first position contacts.

When the stepping mechanism steps to its first position and the relay 282 is de-energized, it closes its normally closed contacts 282–3 of the relay to apply, over a circuit including a differentiating circuit D4 and contacts 278 MT–5 of the relay 278MT, a negative potential to the stage 205b of the multivibrator 205 of the command selector to effect a single stepping of the command selector to the next row of the memory matrix. When the command selector has been stepped, it will, as explained hereinbefore, make a circuit 206 to reset the multivibrator 205 and to apply a negative potential to the input of the signal generator ERW to initiate its erase-read-write cycle. The erase-read-write cycle will set the binary register 65 and, in turn, the contacts thereof in the circuits connected to the stepping mechanism 270 in accordance with the information in the newly selected row of the memory matrix. When the multivibrator 112 of the signal generator ERW for energizing the write relay 113 returns to its stable state, a pulse signal is derived therefrom on a conductor 295 which is connected by the open contacts 278MT–3 of the relay 278MT to effect energization of a relay 296. When the relay 296 is energized, it closes its contacts 296–1 to complete a circuit around the pushbutton switch 281 for starting the stepping mechanism 270 to energize the relay 282 and initiate the stepping cycle once again. The drop-out time of the relay 296 is such as to assure that the switch 286 in the holding circuit for relay 282 closes prior to the opening of contacts 296–1.

The write relay 113 has normally closed contacts 113–3 which, together with normally open contacts 278MT–6 of relay 278MT are included in the afore-mentioned holding circuit for relay 293 which, when energized, renders the switch arms of the stepping mechanism 270 ineffective to energize the punch solenoids 264, 265, 266. Consequently, when the write relay of the signal generator is energized during the erase-read-write cycle to open its contacts 113–3, the relay 293 drops out to close its contacts 293–3 . . . 293–1. Since the relay 113 is not energized until after the signal generator has read the memory matrix and set the binary register 65 in accordance therewith, the punches, 264, 265, 266 will be operated to punch the tape in accordance with the information set in relays 66CFR, 67CFR, 68CFR as soon as the relay 293 drops out. The dropping out of the relay will occur prior to the next stepping of the mechanism 270, since the relay 296 is not energized until the monostable multivibrator 112 for effecting energization of the erase relay 113 returns to its stable state.

From the foregoing, it can be seen that the system can be operated to select a row in the memory to be read and, once the tape punching system is set to operate and started, the stepping mechanism 270 will operate to punch the tape in accordance with the command read with the punch marking the settings of the relay of the binary register 65 on the tape in groups of three and that after each command has been punched on the tape, the system will automatically operate to step the command selector to read the next row in the memory matrix and to punch that row on the tape, etc.

After the tape has been punched, it may also be used to set the memory in accordance with the information recorded thereon. To this end, the system includes a tape reader 300 having three reader units adapted to read a transverse row on the tape. When a hole is opposite a particular reader unit, a circuit is completed to apply a negative potential to the switch arms 271, 272, 273 corresponding to the particular reader unit. In the illustrated embodiment, the reader units are indicated schematically by contacts 301, 302, 303 and the contacts 301, 302, 303 are in respective circuits for applying a negative potential to the switch arms 271, 272, 273, respectively. When the memory is being set in accordance with the tape 261, the switch arms 271, 272, 273, when a negative potential is applied thereto, are adapted to energize relays having contacts for setting a corresponding one of the relays in the binary register to its energized condition. In other words, a relay is provided for each of the relays in the binary register 65 and in FIG. 3, the relays 306, 307, 308 are shown and correspond respectively to the relays 66CFR, 67CFR, 68CFR of the binary register. The relays 306, 307, 308 have one side connected to the contacts 271a, 272a, 273a, respectively, of the stepping mechanism 270 and their other side connected to ground, so that if a negative potential is applied to the contact to which the relay is connected, the relay is energized and, when energized, will close self-holding contacts for completing a circuit for energizing the relay independently of the switch or stepping mechanism 270. These holding contacts are designated in the drawing by the same reference numeral as the relay with a contact number "1" applied thereto. The contacts 306-1, 307-1, 308-1, etc., are connected to the negative side of a power supply through the normally open contacts 305TM-1 of a relay 305TM which is energized when the memory is to be set in accordance with the tape 261. The relay 305TM is energized by operating the switch 279 to its TM position where its contacts 279-2 are closed. The relay 305TM also has normally open contacts 305TM-2 which connect the contacts 301, 302, 303 to the negative side of the power supply, so that when the contacts are closed, a negative potential is applied to the corresponding switch arms 271, 272, 273, respectively, and to the contact in engagement therewith.

The relay 305TM also has normally open contacts 305TM-3, 305TM-4, 305TM-5 and normally closed contacts 305TM-6 and 305TM-7. The purpose of these latter contacts will be apparent from the description which follows hereinafter. The contacts 305TM-7 are included in the circuit for conditioning the gates 116 of the binary registers upon operation of the signal generator ERW and are opened to render the gates ineffective to pass signals on the input connections 117 to the binary register.

When it is desired to set the memory matrix in accordance with the tape 261, the command selector S is operated manually to select the row of the memory into which the information on the tape is to be initially written. When this selection has been made, the switch 30 is set to its TOM position and the switch 279 is operated to its TM position to energize the relay 305TM. The energization of the relay 305TM closes contacts 305TM-2 and renders the tape reader effective to apply negative potentials to the switch arms 271, 272, 273 in accordance with the holes opposite the reader units and to energize the relays 306, 307, 308 in accordance with the information on the tape 261 and closes its contacts 305TM-1 to enable the self-holding circuits to be made upon the energization of the relays 306-308. The energization of one of the relays 306, 307, or 308 closes its respective contact in the binary register 65. If the relay 306 is energized by reason of a hole appearing opposite the reader unit 301 and a negative potential being applied to the switch arm 271, it will close its contacts 306-2 in the circuit in the binary register 65 for applying a positive potential to the multivibrator 66a corresponding to the relay 66CFR. Similarly, the energization of relays 307, 308 will close their contacts 307-2, 308-2 to apply a positive potential to the stage 70b of the multivibrator of the corresponding relays in the register 65. The contacts 306-2, 307-2, 308-2 are connected to a positive potential terminal through normally open contacts 305TM-8 of relay 305TM. The positive potentials applied to stages 70b of the multivibrators 66a, 67a, 68a render these stages conductive and this will energize the relays 66CFR, 67CFR, 68CFR. Therefore, if the relay 305TM has been energized, it will be seen from the foregoing that the system will operate to immediately set the relays connected to the first set of contacts of the stepping mechanism in accordance with read information on the punched tape. The switch 281 is then operated to start the stepping of the mechanism and as the mechanism steps to each following contacts, three different relays will be set to condition corresponding contacts in the binary register corresponding to contacts 306-2, 307-2, etc. When the stepping mechanism has stepped seven times, the maximum number of relays will have been set and the stepping mechanism will, when it steps to its seventh position, operate the switch 292 to energize the relay 293 to open its contacts in series with the switch arms 271, 272, 273 to prevent any inforamtion from being set through the stepping mechanism 270 until the relay 293 is again de-energized. After the switch arm circuits are opened, the stepping mechanism will again be stepped to its initial position as described in conjunction with punching the tape 261 from the memory and the switch 286 opened and the stepping mechanism stopped. When the stepping mechanism 270 stops in its initial position, the relay 282 is de-energized to close its contacts 282-3 as explained in connection with punching the tape 261. This applies a negative potential through contacts 305TM-5 to the input of the signal generator ERW to initiate the erase-read-write cycle. The energization of the erase relay 77E will open its contacts 76 in the erase connections for the multivibrators 66a, 67a, etc., in the binary register. This will reset all of the multivibrators of the binary register 65 and de-energize all of the relays of the binary register 65 except those relays or multivibrators which have a positive potential applied to the stage 70b thereof by reason of the fact that one of the relays controlled by the stepping mechanism 270 is energized. When the erase relay is de-energized, the read relay is operated and this, with the switch 100 in its "write" position, erases the cores in the memory which have been selected by the command selector and after the erase signal, the relay 113 is operated to apply ½ write signals to the row connection 58 selected by the command selector and to the common column connection 79 to write the setting of the binary relays of the register 65 into the memory matrix. The energization of the write relay 113 does not effect a de-energization of the relay 293, as explained hereinbefore, since the relay is not being held energized through the contacts 113-3 since the contacts 278MT-6 are open. The holding circuit for the relay 293, when the relay 305TM is energized, is completed by normally open contacts 305TM-9 of the relay 305TM and normally closed contacts 310-1 of a relay 310. The relay 310 is energized when the multivibrator 112 returns to its stable state and the momentary energization of the relay 310 opens the contacts 310-1 to break the holding circuit through contacts 305TM-9 for the relay 293. The relay 310 also has normally closed contacts 310-2 in series with the contacts 305TM-1 for connecting the holding circuits for relays 306, 307, 308 to the negative side of the power supply so that the holding circuits for these relays are momentarily opened after the information is written into the memory matrix.

The return of the multivibrator 112 also causes the change command relay or multivibrator 205 in the command selector to be triggered to effect one step of the command selector to select the next row of the memory. The multivibrator 112 is connected by a connection 311 to the stage 205b of the multivibrator 205, the connection 311 including the normally open contacts 305TM–4 of the relay 305TM. The signal which appears on the connection 311 is a pulse signal. When the command selector has taken one step, the multivibrator 205 is triggered to its normal state to effect a de-energization of the change command relay of the command selector by a signal which appears on the connection 206. The connection 206 is also connected to the connection 295 for energizing the relay 296 through a conductor 314 including the normally open contacts 305TM–3 of the relay 305TM. When the signal appears on the connection 314, the relay 296 is momentarily energized to complete the connection about the pushbutton switch 281 to energize the relay 282 to operate the stepping mechanism 270 to read the information on the tape and set the binary register 65 in accordance therewith.

From the foregoing, it can be seen that the system after starting will automatically operate to set commands punched on the tape 261 into the binary register, and then to write the information from the register into the memory, to select the next row of the memory and to initiate the reading of the next command on the punched tape. Consequently, the whole memory can be set by merely initiating the operation.

It will be noted that the relay 305TM also has normally closed contacts 305TM–6 in the connection between the circuit 206 and the input of the erase-read-write signal generator to prevent a signal cycle from being initiated when the change command multivibrator 205 is reset at the end of the stepping operation subsequent to the writing of the tape inforamtion into the cores. Also the relay 305TM has contacts 305TM–10 in the connection 78 to break this connection during the setting of the memory matrix from the tape.

In the system for punching a tape in accordance with the memory matrix M and for setting the memory matrix M in accordance with a tape, the stepping mechanism 270 is always conditioned to effect the punching or reading of the tape except when the relay 293 is energized. It will be understood by those skilled in the art that the tape reader and tape punch could be operated only in response to a signal issued each time the stepping mechanism is moved to engage the switch arms 271, 272, 273 with a new contact. For example, the circuits between the switch arms and the tape reader or tape punch might be conditioned to be effective only momentarily when the switch arms are in engagement with a new contact. Moreover, the switch arms 271, 272, 273 could engage a contact after they have set the relays, 306, 307, etc., or read the register 65 which causes relay circuitry to be energized to effect either the writing of information into the memory or the reading of the next row of the memory, depending upon whether the system is operating from tape to memory or from memory to tape. This relay circuitry would perform the same function as the switches 292, 286 of the described embodiment and effect operation of the signal generator ERW and the command selector S in the sequence described for writing information into the memory or reading the information from the memory into the binary register.

It can now be seen that the present invention has provided a new and improved machine wherein the setting of the manually settable control elements of the machine can be recorded in the memory and subsequently used to control the machine, or can be transferred from the memory to a permanent type intelligence-carrying record, such as a punched tape. Moreover, in the illustrated machine, the punched tape is adapted to be read by a tape reader and the memory set in accordance therewith. The machine is also adapted to be controlled by a pulse-responsive system controlled by an intelligence-carrying record, such as a punched tape, and the control of the machine can be transferred between the pulse-responsive system and the memory system in response to information contained in the memory system or in the pulse system. In describing the transfer of the control of the system from the memory to a pulse-responsive system, the memory has been described as having a core in each row which is set when the memory is to effect a transfer of the system to the tape for controlling the pulse system. When transfer is to be effected, one row of the memory matrix has been allocated to make this transfer. It will be understood that a separate row of the memory need not be used but that the core 243 could be set with the last command to be performed by the memory before the transfer and the core could effect a setting of relay circuitry to route the signal from the comparator upon the completion of the command to effect energization of the transfer relay.

In addition to the foregoing, it will be understood that the relays 186, 198AR and 34TOM controlled by the selector switch 30 may have contacts, not described, for interlocking the various circuits so that they operate or do not operate during the various modes of operation of the machine. Only the contacts of these relays, as well as the other relays described herein, that were necessary to explain the operation of my invention have been shown and described herein.

While a preferred embodiment of the present invention has been described in considerable detail, it is hereby my intention to cover all constructions, modifications, and arrangements which fall within the ability of those skilled in the art and within the scope and spirit of the present invention.

Having described my invention what I claim is:

1. A machine having a movable member, a plurality of manually settable control elements having different conditions for effecting control of said movable member, means providing electrical manifestations for said control elements having unique characteristics for each condition of the control element, an erasable information storage, means for setting said storage in accordance with said electrical manifestations to record the condition of said control elements in said storage, means for reading out information stored in said storage and including register means for producing electrical manifestations in accordanc with the stored electrical manifestations and circuit means for setting said control elements in accordance with the electrical manifestations of said register means to effect operation of said movable member in accordance therewith.

2. A machine according to claim 1 and further comprising tape reading means and punching means, circuit means connecting said tape punching means to be controlled by said storage and circuit means connecting said tape reading means to the input of said storage.

3. A machine having a movable member, a plurality of manually settable control elements having different conditions for effecting control of said movable member, means providing electrical manifestations for said control elements having unique characteristics for each condition of the control elements, means providing a unique electrical manifestation for various positions of said movable member, a memory for storing information electrically, means for setting said memory in accordance with said electrical manifestations to record the condition of said control elements and the position of said movable member in said memory, means for reading out stored information and including register means for producing electrical manifestations in accordance with the stored electrical manifestations and circuit means for setting said control elements in accordance with the electrical manifestations of said register means to effect operation of said movable member in accordance with said memory.

4. A machine having a movable member, a plurality of relay devices for controlling the movement of said movable member in accordance with the conditions of energization and de-energization of said devices, a memory for storing bits of information in a binary code, means for providing bivalued electrical signals indicating the condition of said devices at a given time, means for setting said memory in accordance with said signals to store a command for subsequent use in controlling the machine, read-out means for reading a stored command including binary register means set in accordance with the command, and circuit means controlled by said register for energizing said devices in accordance with the information set in said register means.

5. A machine according to claim 1 and further comprising tape reading means and tape marking means, circuit means connecting said tape marking means to be controlled from said memory, and circuit means connecting said tape reading means to the input of said memory for setting the latter in accordance with a tape.

6. A machine as defined in claim 4 wherein said memory is adapted to store a plurality of commands to be read out in sequence and which includes means for reading out the commands one after another.

7. A machine having a movable member and encoding means for producing a manifestation comprised of a plurality of binary-coded signals which numerically represent the position of said member with respect to a predetermined reference, a plurality of relay devices having conditions of energization and de-energization for controlling the movement of said movable member, a comparator for comparing a manifestation of bivalued signals representing a position of said movable member with the manifestation from said encoding means and providing a signal indicating whether or not there is correspondence between the manifestations, means controlled by said relay devices and responsive to said comparator to effect movement of said movable member in accordance with the settings of said relay devices to effect correspondence between the manifestations applied to said comparator, a memory device adapted to store a plurality of commands in binary form and representing the conditions of said relay devices and a position of said member, means for producing binary-coded signals representing the condition of said control elements, write means for setting said memory in accordance with said binary-coded signals and read-out means for reading a command in said storage and including register means for registering the command and circuit means controlled by said register, and means for energizing said control elements and setting said comparator in accordance with said register means.

8. A machine tool having a rotatable spindle and a movable member to be moved relative to said spindle in a predetermined manner, first control devices for controlling the rotation of said spindle, second control devices for controlling the movement of said member, means providing unique electrical manifestations indicating the settings of said control devices, a memory adapted to store a plurality of commands representing the conditions of said devices, means for successively setting said memory in accordance with successive manifestations representing successive settings of said devices to store a plurality of commands in the memory representing operations to be performed in succession, means for reading said commands including register means for registering a command, and circuit means for setting said control devices in accordance with said register means.

9. A machine tool as defined in claim 8 wherein said control devices are relays and said manifestations comprise binary-coded signals representing the condition of energization and de-energization of said devices.

10. In a machine having a movable member, manually controlled devices for effecting movement of said member in a desired manner, a first system for effecting automatic movement of said member comprising actuating means for effecting an incremental movement of said member for each electrical pulse applied thereto, reading means for reading an intelligence-carrying record and means responsive to said reading means for controlling the rate and number of pulses applied to said actuating means to move said member as dictated by said record, a second system for controlling said machine comprising an information storage adapted to store a plurality of commands, means for setting said information storage in accordance with said devices to provide a command to be used to control said machine, means for reading one at a time commands stored in said storage comprising register means settable in accordance with the command which is read, circuit means controlled by said register means for setting said devices to effect operation of said machine in accordance with the command set in the register means, and transfer means operable by said reading means in response to intelligence on said record and in response to information in said storage for transferring control of said member between said systems.

11. A machine as defined in claim 10 wherein said second system includes a comparator having first and second numerical inputs to which electrical signals representing position numbers are applied and providing a signal when there is correspondence in said numbers, circuit means connecting said register means to said first input, a coding device movable with said member and having a plurality of zones thereon with each zone having divisions of two different characteristics arranged alternately with said zones and said zones being graduated from coarse to fine, said coding device having reading units for said zones and said reading units providing electrical signals representing the position number of said member, means connecting said reading units to said second input, one of said zones and its reader constituting an incremental pulse generator, and said first system further comprising means responsive to pulses from said pulse generator for totaling said pulses.

12. A machine as defined in claim 10 wherein said second system includes a comparator having first and second numerical inputs to which electrical signals representing position numbers are applied and providing a signal when there is correspondence in said numbers, circuit means connecting said register means to said first input, a coding device movable with said member and having a plurality of zones thereon with each zone having divisions of two different characteristics arranged alternately with said zones and said zones being graduated from coarse to fine, said coding device having reading units for said zones and said reading units providing electrical signals representing the position number of said member, means connecting said reading units to said second input, said first system comprising quantizing means responsive to the fine zone of said coding device and providing feedback pulses for each increment of movement, and including the one of said reading units for the fine zone to which said quantizing means is responsive, and said transfer means including means for switching the connection of said reading units between said quantizing means and said comparator means.

13. A machine having a movable member to be controlled, a pulse-responsive system for effecting movement of said member comprising actuating means for effecting an incremental movement of said element for each electrical pulse applied thereto, record reading means for reading an intelligence-carrying record and means responsive to said reading means for controlling the rate and number of pulses applied to said actuating means to move said member as dictated by said record, a second system for controlling said member comprising an information storage adapted to store a plurality of commands which can be read, set, and erased individually, circuit means for writing commands into said storage, storage reading means for reading commands in said storage one at a time including read-out register means set in accordance with each command when read, operating means responsive to said register means for controlling said movable member in accordance with the setting of said register means, and transfer means operable by said record reading means in response to intelligence on said record and by said storage reading means in response to information stored in said memory for transferring the control of said member between said systems.

14. A machine according to claim 13 and further comprising second record reading means for reading a record having intelligence thereon and record marking means for recording intelligence on a record, circuit means connecting said second record reading means to set said storage and circuit means connecting said record marking means to said register means to effect a marking of a tape in accordance with said register means.

15. A machine as in claim 13 wherein said actuating means effects operation of said member at a rate dependent on the frequency of pulses applied thereto and wherein register means is controlled by said record reading means for determining the rate and number of pulses applied to said pulse-responsive means and wherein said second system includes a rate circuit responsive to the setting of said read-out register means for controlling the rate of movement of said element and a comparator having one input determined by said read-out register means of said read-out means and a second input indicating the position of said member for starting and stopping the movement of said member, said transfer means having a first condition rendering said rate circuit and said comparator effective to control said member and a second condition rendering said pulse-responsive means effective to control said member.

16. A machine as defined in claim 13 wherein said circuit means for writing commands into said storage includes said register means, first circuit means for setting said register means independently of said storage and means for setting said storage in accordance with said register means.

17. A machine as defined in claim 16 and further comprising second record reading means and record marking means for respectively reading and marking intelligence on a record, circuit means connecting said record reading means to set said register means and further circuit means connecting said register means to control said record marking means.

18. In a machine tool having a movable member to be moved in a predetermined manner, control devices for controlling the movement of said member, means providing unique electrical manifestations indicating the settings of said control devices, a memory having a plurality of individual information storages and each adapted to store a command representing the conditions of said devices, command selector means for selecting one of said individual storages to be set or read and responsive to a signal to step from one storage to the next storage of said memory, register means for storing information to be read into and information read from one of said storages, memory control means selectively operable to write information set in said register means into the storage selected by said command selector and to read the storage selected by said command selector and set said register means in accordance therewith, first circuit means selectively responsive to the operation of said selector to select the storage for initiating operation of said control means to read the selected storage and set said register means, second circuit means for selectively setting said register means in accordance with said unique electrical manifestations indicating the settings of said control devices, third circuit means controlled by said register means for energizing said control devices in accordance with the information in said register means, and means responsive to the operation of said machine in response to information in said register means for providing said signal and actuating said command selector to select and read the next storage of said memory.

19. In a machine tool having a movable member to be moved in a predetermined manner, control devices for controlling the movement of said member, means providing unique electrical manifestations indicating the settings of said control devices, a memory having a plurality of individual information storages and each adapted to store a command representing the conditions of said devices, command selector means for selecting one of said individual storages to be set or read and responsive to a signal to step from one storage to the next storage of said memory, register means for storing information to be read into and information read from one of said storages, memory control means selectively operable to write information set in said register means into the storage selected by said command selector and to read the storage selected by said command selector and set said register means in accordance therewith, first circuit means selectively responsive to the operation of said selector to select the storage for initiating operation of said control means to read the selected storage and set said register means, second circuit means selectively responsive to the operation of said control means to set a selected storage in accordance with said register means and for effecting operation of said command selector to select the next storage in response to the setting of the information, record-marking means selectively operable to make a record in accordance with said register means, means responsive to the marking of a record in accordance with said register means to provide said signal to operate said command selector and conditioning said first circuit means to be effective to operate said command selector to the next storage and to set the register means, record-reading means selectively operable to read a record and to set said register means in accordance with the record, and means responsive to the setting of said register means by said record-reading means to effect operation of control means to set the selected storage in accordance with said register means to render said second circuit means effective, third circuit means for selectively setting said register means in accordance with said manifestations representing the condition of said control devices, fourth circuit means controlled by said register means for energizing said control devices in accordance with the information in said register means, and means selectively responsive to the operation of said machine in response to information in said register means for providing said signal and actuating said command selector to select the next storage of said memory and conditioning said first circuit means to be effective.

20. In a machine, a device for indicating the angular position of a shaft comprising, a disk rotatable in accordance with rotation of the shaft, said disk having a code inscribed thereon consisting of a plurality of concentric zones each having a plurality of alternate transparent and opaque portions, a plurality of reading units each for reading a separate one of said zones and for producing outputs variable in response to rotation of said disk, decoding means responsive to the outputs of the code reading units to effect decoding of said code, one of said zones and its reader unit constituting an incremental pulse generator, and means responsive to pulses from said pulse generator for totaling said pulses.

21. In a machine, a device for indicating the angular position of a shaft comprising, a disk rotatable in accordance with rotation of the shaft, said disk having a code inscribed thereon consisting of a plurality of concentric zones each having a plurality of alternate transparent and opaque portions, a plurality of reading units each for reading a separate one of said zones and for producing outputs variable in response to rotation of said disk, decoding means responsive to the outputs of the code reading units to effect decoding of said code, one of said zones and its reader unit constituting an incremental pulse generator, means responsive to pulses from said pulse generator for totaling said pulses, and switch means for selectively connecting the reading unit of the pulse generator to said decoding means and to said last-named means.

22. In a machine having a movable member and a shaft rotatable in timed relation to movement of said member and in accordance with the amount of movement of said member, a first system for effecting automatic movement of said member in incremental steps in response to electrical pulses applied thereto, a second system for effecting automatic movement of said member in response to a command signal and including storage means for storing a plurality of commands, transfer means operable to transfer control of the movement of said member between said systems, and means for indicating the angular position of said shaft when movement of said member is effected by said first system and said second system and including a disk rotatable in accordance with rotation of said shaft, said disk having a code inscribed thereon consisting of a plurality of concentric zones each having a plurality of alternate transparent and opaque portions, a plurality of reading units each for reading a separate one of said zones and for producing outputs variable in response to rotation of said disk, decoding means responsive to the outputs of the code reading units to effect decoding of said code, one of said zones and its reader unit constituting an incremental pulse generator, and means responsive to pulses from said pulse generator for totaling said pulses.

References Cited by the Examiner

UNITED STATES PATENTS

| | | | |
|---|---|---|---|
| 2,537,770 | 1/1951 | Livingston et al. | 318—162 |
| 2,679,644 | 5/1954 | Lippel et al. | 340—354 |
| 2,852,764 | 9/1958 | Frothingham | 340—204 |
| 2,943,251 | 6/1960 | Hull | 318—162 |

JOHN F. COUCH, *Primary Examiner.*

LEON PEAR, *Examiner.*